July 4, 1961  J. M. SARLEY ET AL  2,990,957
RECORD CARD SORTING COLLATOR
Filed Dec. 20, 1955  18 Sheets-Sheet 1

INVENTORS
JOSEPH M. SARLEY
JOHN R. NATVIG

BY *J. Tancin Jr.*
ATTORNEY

CODE RELAYS
PICK CIRCUITS

MACHINE OPERATIONAL CIRCUITS

CODE RELAY
HOLD CIRCUITS

CORRECTION RELAYS

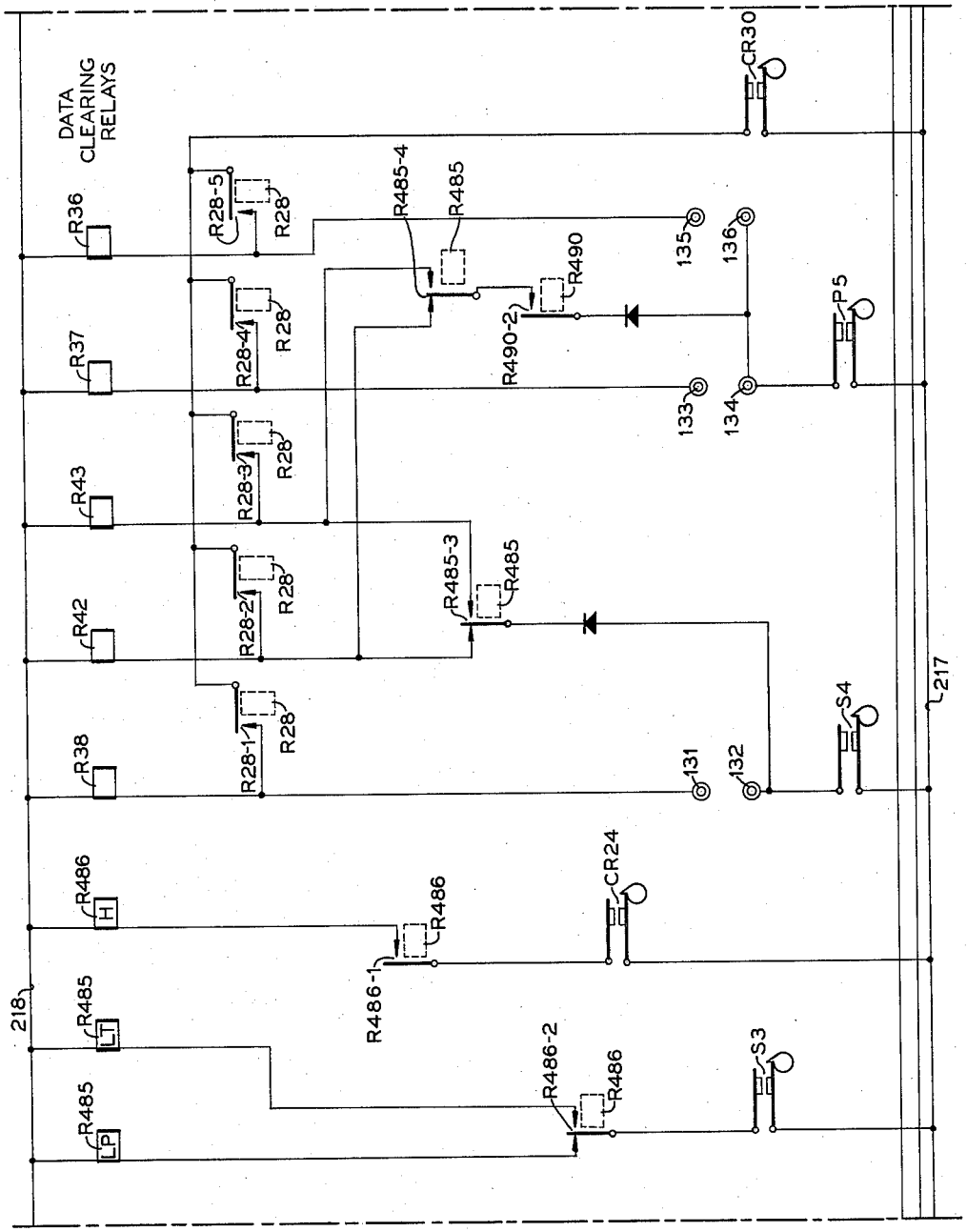

July 4, 1961  J. M. SARLEY ET AL  2,990,957
RECORD CARD SORTING COLLATOR
Filed Dec. 20, 1955  18 Sheets-Sheet 18

United States Patent Office 2,990,957
Patented July 4, 1961

2,990,957
RECORD CARD SORTING COLLATOR
Joseph M. Sarley, Binghamton, and John R. Natvig, Great Kills, N.Y., assignors to International Business Machines Corporation, New York, N.Y., a corporation of New York
Filed Dec. 20, 1955, Ser. No. 554,254
12 Claims. (Cl. 209—110)

This invention relates in general to record card assorting machines, and in particular to record card collating machines for arranging a plurality of sets of disassorted record cards into one assorted set.

As is recognized by persons familiar with this art, record controlled machines having a great deal of flexibility for selecting, associating and disassociating related record cars being advanced along a plurality of card feed paths, are known as collators. Such a record card controlled collator is described in U.S. Patent No. 2,359,670 which issued on October 3, 1944, to R. E. Page, and may perform a variety of operations as, for example, filing cards, removing cards from the files, matching related cards or related sets of cards and either refiling them or removing all of the related cards from the files, etc. The aforementioned collator is a cyclically operable machine comprising a primary card feed unit and a secondary card feed unit for advancing successive, sequentially arranged record cards from respective card hoppers past one or more reading stations to a card distributing mechanism for effecting select stacker pocket card distribution in accordance with the control data carried by the record cards and sensed by the aforesaid reading stations. As stated hereinabove, the primary feed and the secondary feed record cards operated upon by the said collator must be arranged in sequential order for the collating machine to function properly.

As is also well known by persons familiar with this art, record card sorters are card controlled machines having a single card feed for a single set of cards and a plurality of card stacker pockets, one for each sort category, into which the assorted record cards are fed. A machine of this general type is shown and described in Patent No. 1,698,844 which issued to E. A. Ford on January 15, 1929.

The preferred embodiment of this invention might be looked at as a somewhat modified collator for performing the function of a plural card feed sorter, so as to effect an operation referred to throughout this entire specification as sorting-by-collation. That is, a set of disassorted primary record cards and a set of disassorted secondary record cards are, in effect, collated into a single set of assorted record cards by the sorting-by-collation machine to be described. Thus, sets of primary and secondary cards which may be arranged in any random order can be grouped into a single set having a definite sequential order.

Accordingly, a broad object of this invention is to provide an improved record card controlled machine for arranging a plurality of sets of disassorted record cards into one assorted set.

It will become clear as the description advances that to accomplish a sorting-by-collation operation, the sorting-by-collation machine must function in accordance with certain operating rules. Prior to covering these rules even briefly, the following definitions relating to certain machine conditions must be advanced:

(1) A secondary step-down condition will occur when the control data on a card in the secondary feed are lower than the control data on the preceding card thereto; i.e., a low secondary sequence condition.

(2) A secondary step-up condition will occur when a card in the secondary feed has a control data value either higher than or equal to the control data value on the preceding card thereto; i.e., a high or an equal secondary sequence condition, respectively.

(3) A primary step-down condition will occur when a low primary sequence condition which is detected during one machine cycle, is followed by a primary card feed operation during the next following machine cycle.

(4) A primary step-up condition will occur as a result of (a) a low primary sequence condition of one machine cycle which is not followed by a primary feed cycle, or (b) a high primary sequence condition, or (c) an equal primary sequence condition.

(5) A low primary cross-feed condition will occur when the control data value on a primary card is lower than the control data value on a corresponding secondary card.

(6) A low secondary cross-feed condition will occur when the control data value on a secondary card is lower than the control data value on a corresponding primary card.

(7) An equal cross-feed condition will occur as a result of the control data value on a primary card being equal to the control data value on a corresponding secondary card.

It was stated previously that the present sorting-by-collation machine operates according to several definite rules. The rules which govern the record card feeding apparatus will be covered fully hereinafter, and are summarized as follows:

(1) A primary card feed operation will occur consequent upon a low primary cross-feed condition which is accompanied by similar primary and secondary sequence conditions.

(2) A primary card feed operation will occur consequent upon a low secondary cross-feed condition which is accompanied by different primary and secondary sequence conditions.

(3) A secondary card feed operation will occur as a result of a low secondary cross-feed condition which is accompanied by similar primary and secondary sequence conditions.

(4) A secondary card feed operation will occur as a result of a low primary cross-feed condition which is accompanied by different primary and secondary sequence conditions.

(5) Simultaneous primary and secondary card feed operations will occur consequent upon an equal cross-feed condition without regard to the primary and secondary sequence conditions.

On the basis of the foregoing information, the general operation of the sorting-by-collation machine may now be stated briefly. Record cards from a single card feed unit, e.g., the primary feed unit, are advanced from the primary hopper into a stacker pocket until there is a first sequence step-down condition. As a result, the secondary feed unit record cards will be advanced into the said stacker pocket until there is another, i.e., a second, sequence step-down. Due to the two sequence step-down conditions, there will occur a stacker pocket shift operation so that any additional record cards to be advanced by either of the feed units, will be so advanced into the second stacker pocket. The record cards in the two feed units will then continue to be advanced in much the same manner as just stated, and in accordance with the afore-mentioned rules, until two sequence step-down conditions are detected once again. Thereupon, another stacker pocket shift operation will take place so that additional record cards to be advanced by either feed unit, will be moved into the first-mentioned stacker pocket since there are only two stacker pockets. Furthermore, if the record card feed cycle immediately following a pocket shift operation is a primary cycle, the secondary sequence inferior data will be cleared out of the data storage unit therefor during said primary feed cycle. Hence, as will be explained in detail hereinafter, the sorting-by-collation machine operation will start anew automatically. For the sake of definition and clarity, a record card and the data stored therein are referred to as being in dominant position with respect to, or dominant to, a preceding record card or the data therein. Conversely, a record card and the data stored therein are referred to as being in an inferior position with respect to, or inferior to, a following record card or the data therein. Hence, during the normal advance of record cards through a feed unit, a record card will first stand in a dominant position because the data therein are compared with the data of the preceding card thereto, and will then stand in an inferior position during a later cycle because the data therein are compared with that on a following card.

Another object of this invention is to provide a record card controlled machine for effecting a primary card feed operation as a result of a low primary cross-feed condition which is accompanied by similar primary and secondary sequence conditions, or a low secondary cross-feed condition which is accompanied by different primary and secondary sequence conditions.

In line with the foregoing, another object of this invention is to provide a record card controlled machine for effecting a secondary card feed operation as a result of a low secondary cross-feed condition which is accompanied by similar primary and secondary sequence conditions, or a low primary cross-feed condition which is accompanied by different primary and secondary sequence conditions.

Another object of this invention is to provide an improved record card distributing apparatus for directing record cards being advanced via primary and secondary feed units to common stacker pockets.

Another object of this invention is to provide a record card distributing apparatus for effecting a stacker pocket shift operation consequent upon primary and secondary sequence step-down conditions.

Another object of this invention is to provide a sorting-by-collation machine for automatically starting a sorting-by-collation operation anew in response to a sequence step-down in each of the plural card feed units.

Still another object of this invention is to provide a primary and a secondary card feeding machine wherein the secondary inferior data are automatically cleared out consequent upon a primary feed cycle operation immediately after primary and secondary sequence step-down conditions.

It should be clear by now that to accomplish a sorting-by-collation operation, it is necessary to sequence compare the control data on the record cards in each of the record card feed units. That is, the data on a record card must first be compared with the data on a next preceding card, and then with the data on a next following card. Hence, during the normal advance of record cards through a record card feed unit, a card must first stand in a dominant position because the data thereon are compared with the data on a preceding card, and must then stand in an inferior position because the data thereon are compared with that on a following card. Since the preferred embodiment of this invention includes a single record card sensing station for reading the control data stored in the secondary cards, and in view of the fact that a record card must stand in a dominant position as well as an inferior position while being advanced through its respective feed unit, the data storage and comparing device which is associated with the said secondary card sensing station, is required to retain a single card data for at elast two secondary card feed cycles. Thus, during the first cycle the data would stand in a dominant position, whereas during the next cycle the data would stand in an inferior position. As the description advances, it will be explained just how the data are entered into the aforesaid storage and comparing device during one card feed cycle as dominant data, and are then altered to an inferior position during a subsequent machine card feed cycle. It should be apparent that to perform such a function whereby a single data entry may partake of a dominant position during one feed cycle and an inferior position during another feed cycle, the input to, and the the output from, the said storage and comparing device must be controlled so as to simulate a condition whereby the same card data are read twice. This function whereby the secondary control data are changed from a dominant position to an inferior position, is referred to herein as data tumbling. Of course, during the machine cycle in which data are tumbled, the data carried on a following record card are directed for machine storage as dominant data.

Accordingly, another object of this invention is to provide in a cyclically operable record card controlled machine having a single record card reading station, a data comparator for handling data which may stand in a dominant position during one machine cycle and in an inferior position during a subsequent machine cycle.

Another object of this invention is to provide an apparatus for automatically tumbling data which are initially stored in a data comparing device in a dominant position, to data in an inferior position.

In keeping with the foregoing, another object of this invention is to provide an improved record card controlled machine having a single card data reading station which is associated with apparatus for sequence comparing data carried by the record cards that are advanced past said station.

Other objects of the invention will be pointed out in the following description and claims and illustrated in the accompanying drawings, which disclose, by way of examples, the principle of the invention and the best mode, which has been contemplated, of applying that principle.

FIGS. 6a to 6k, inclusive, form a wiring diagram for the sorting-by-collation machine.

Figure 7:
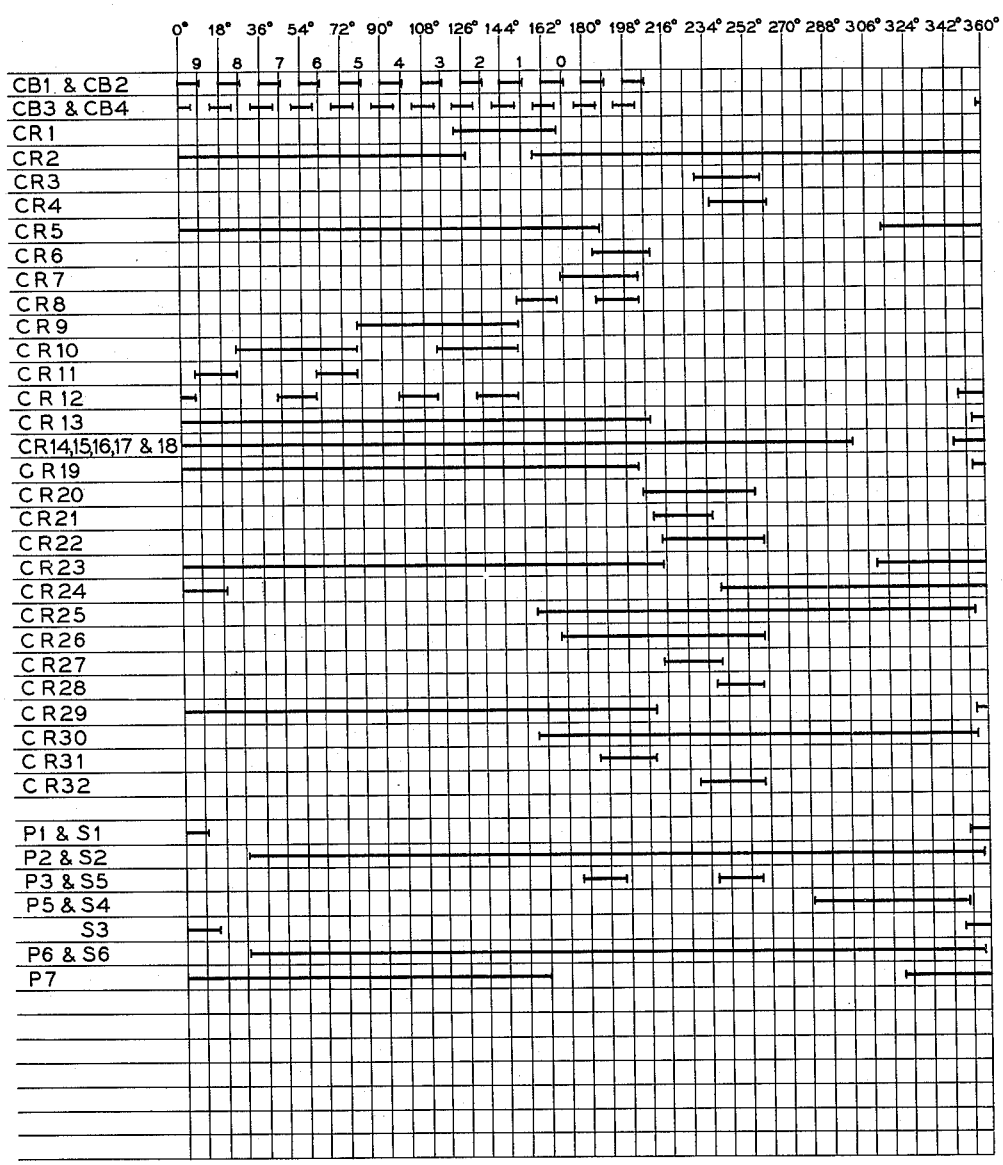

FIG. 7 is an electrical timing chart.

Figure 8:
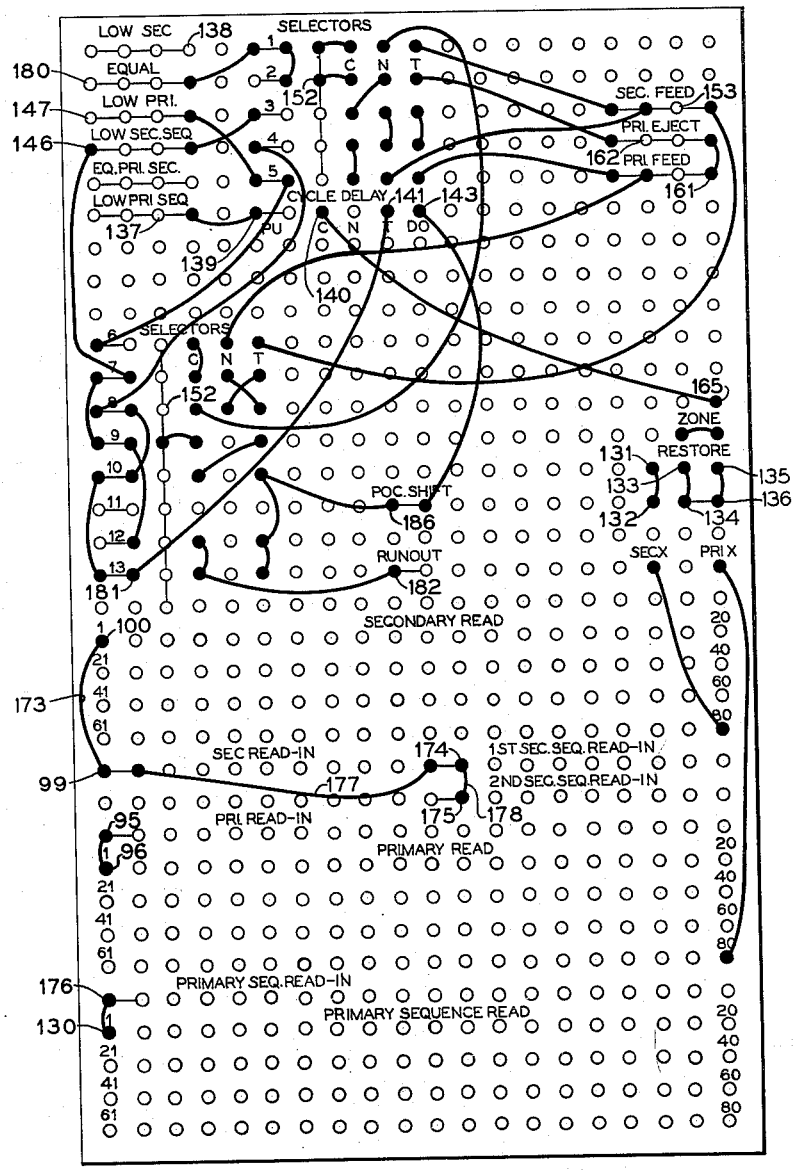

FIG. 8 is a front view of the removable plugboard for the sorting-by-collation machine.

FIGS. 9a to 9j, inclusive, are schematic card feeding diagrams showing the step-by-step advancement of primary and secondary record cards to the card receiving stacker pockets in order to effect a sorting-by-collation operation.

GENERAL MACHINE OPERATION

Figure 5:
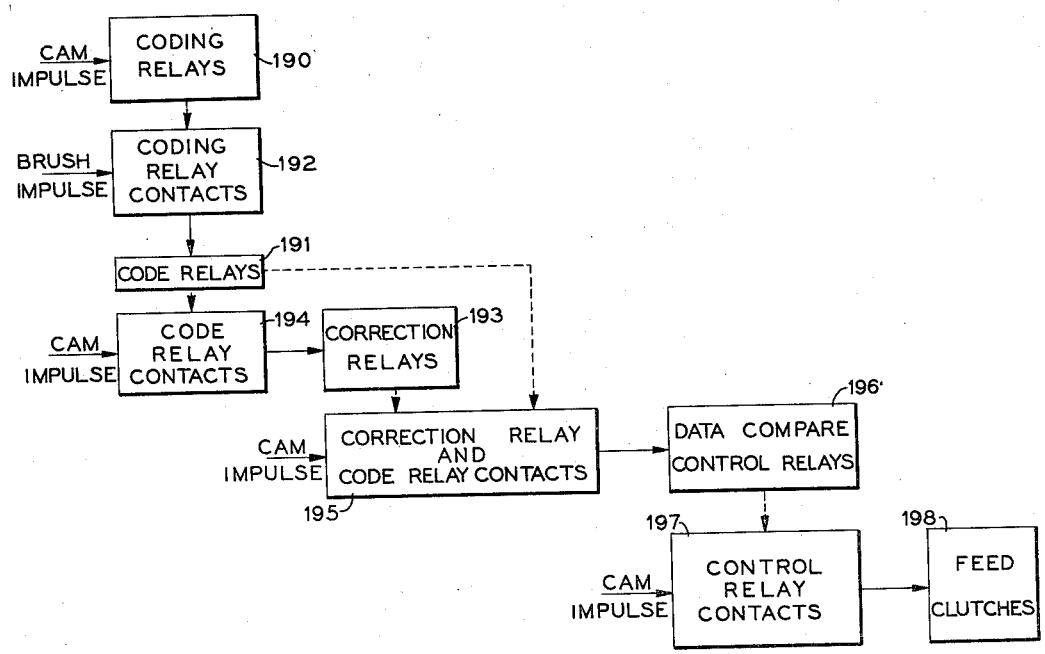
FIG. 5 is a block diagram depicting the general scheme of operation for said sorting-by-collation machine.

As stated previously, the preferred embodiment of this invention will arrange two sets of disassorted record cards into one assorted set. The general scheme of operation for the sorting-by-collation machine, is shown in FIG. 5. Coding relays represented in FIG. 5 by block 190 are shown in detail in FIG. 6a. These relays pick every machine cycle at definite machine code times under control of cam directed impulses. Hence, the coding relays operate according to a predetermined machine code pattern so that record card data brush impulses which are transmitted via coding relay contacts 192

Figure 6A:
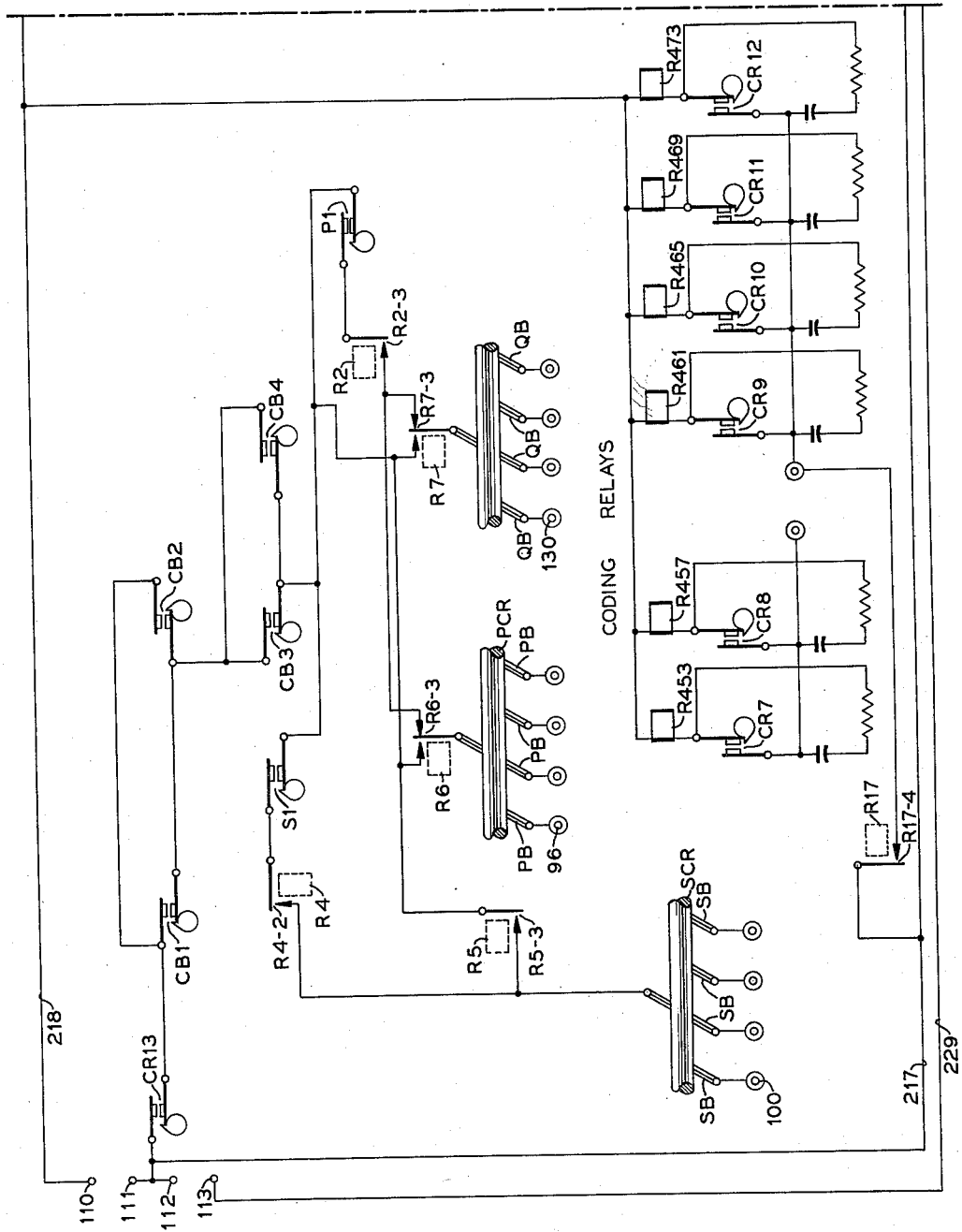
Figure 6B:
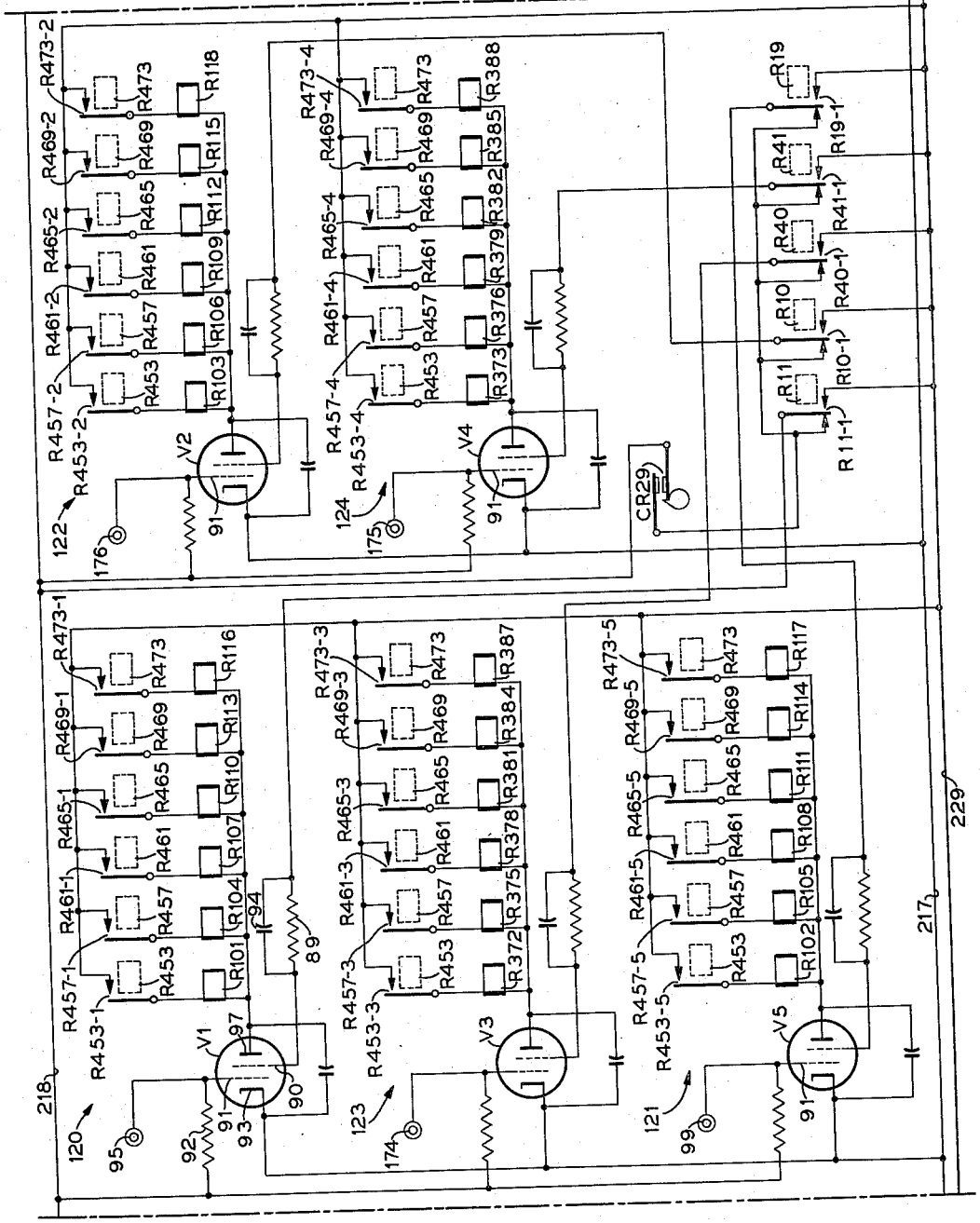

(FIG. 5), energize corresponding code relays which are represented in FIG. 5 by block 191 and are shown in detail in FIG. 6b. By means of the code relays, the record card data are translated into a machine code through which there is effected a comparison of blank column, special character, alphabetic and numeric data. As the description advances, it will become clear that there are six different code relays associated with each data comparing position, and as many as five of these relays may be energized during a single card feed cycle so as to represent a single character. As is understood by persons familiar with the well-known IBM Alphabetic Collator of the type show and described in the Phelps et al. Patent No. 2,602,544 which issued on July 8, 1952, the code relays alone are not enough to accomplish the job of comparing blank columns and special characters. Actually, the code relays alone will suffice for effecting the comparison of alphabetic and numeric symbols only. It is for this reason that the correction relays represented in FIG. 5 by block 193, are provided. The pick circuits for these relays are shown in detail in FIGS. 6e and 6f, which pick circuits, as shown in FIG. 5, are governed by other circuits that include the code relay contacts 194. It must be explained here that the broken line connecting block 191 to block 195 is to indicate that the correction relays need not be, and are not, always picked.

Figure 6C:
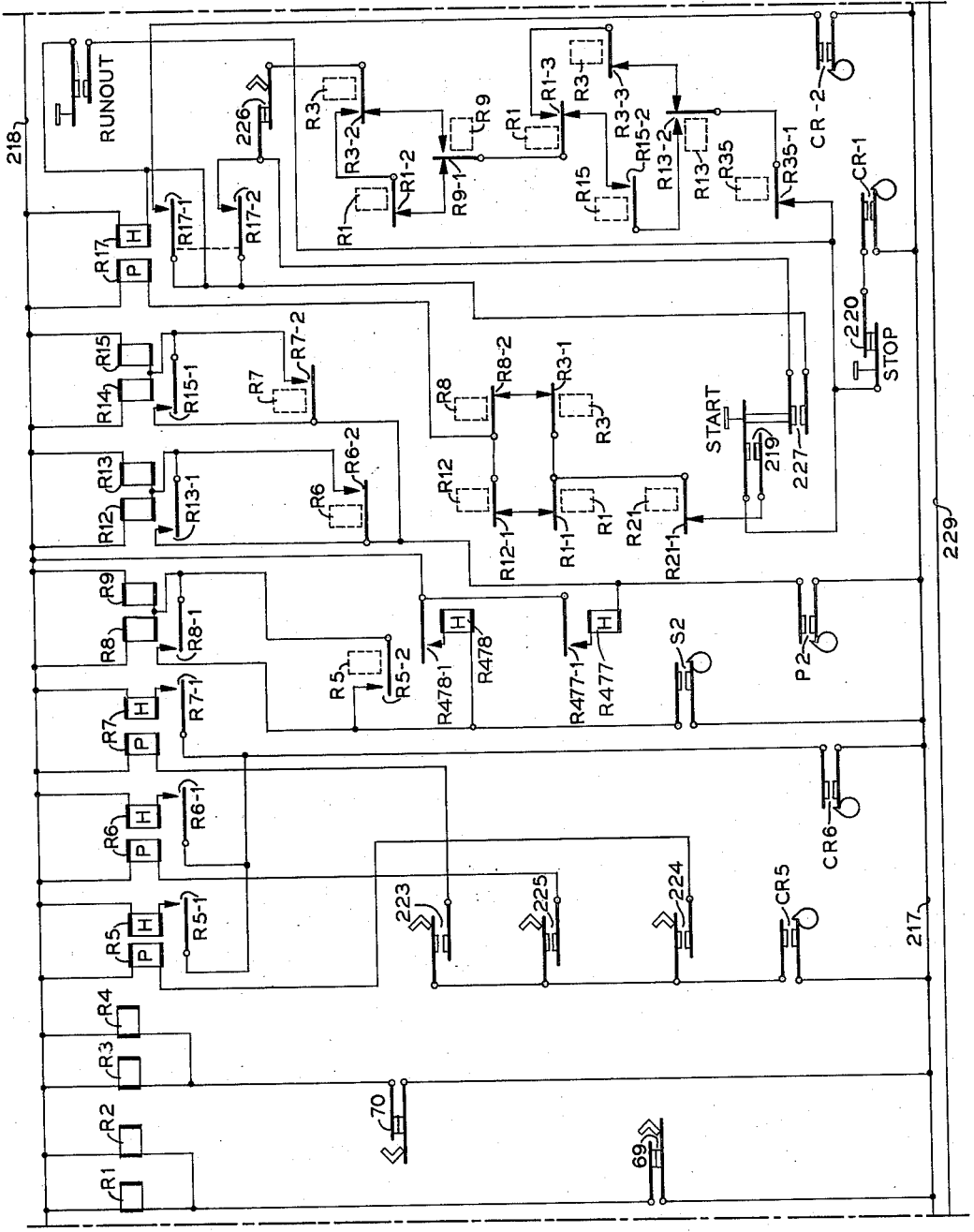
Figure 6D:
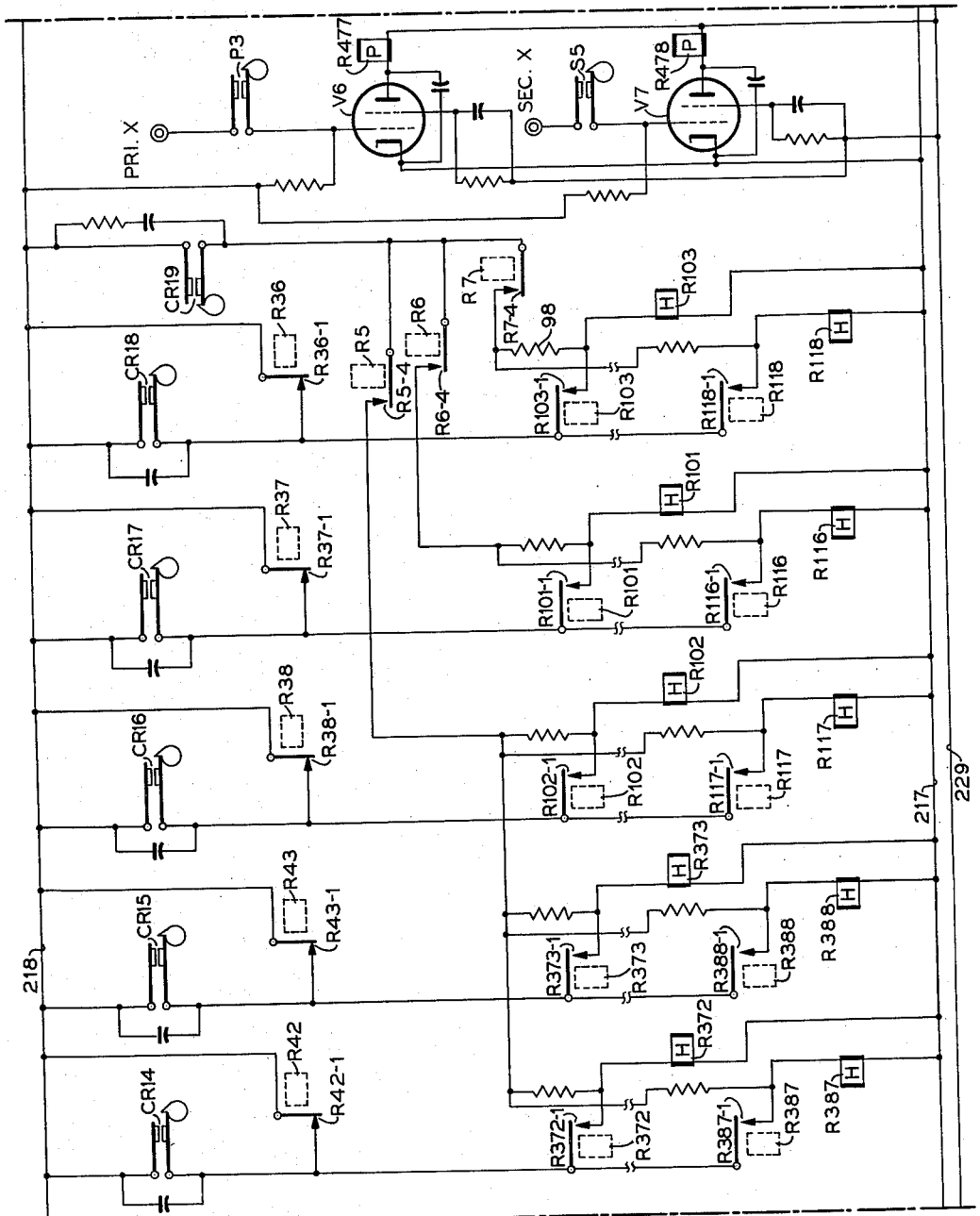
Figure 6E:
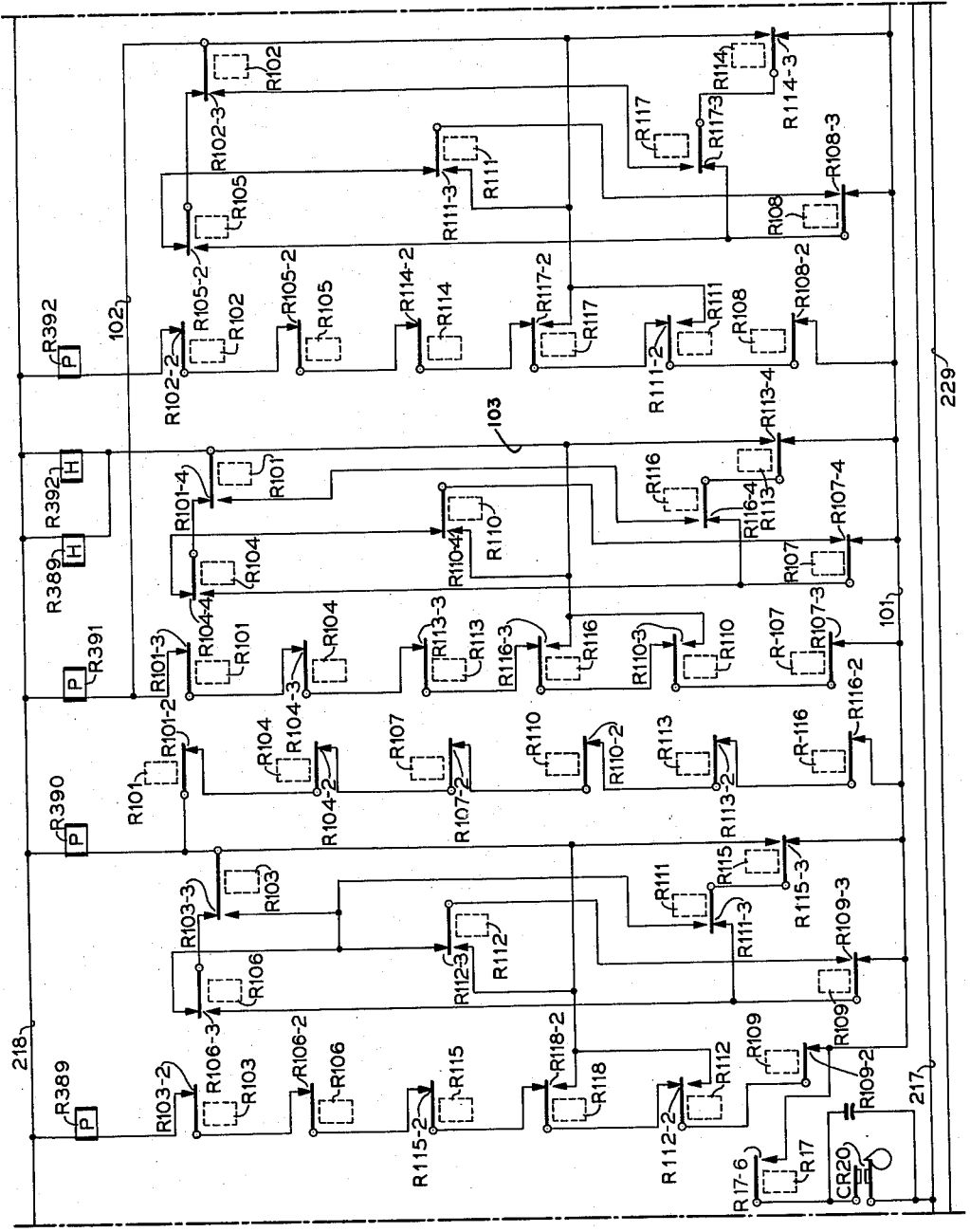
Figure 6F:
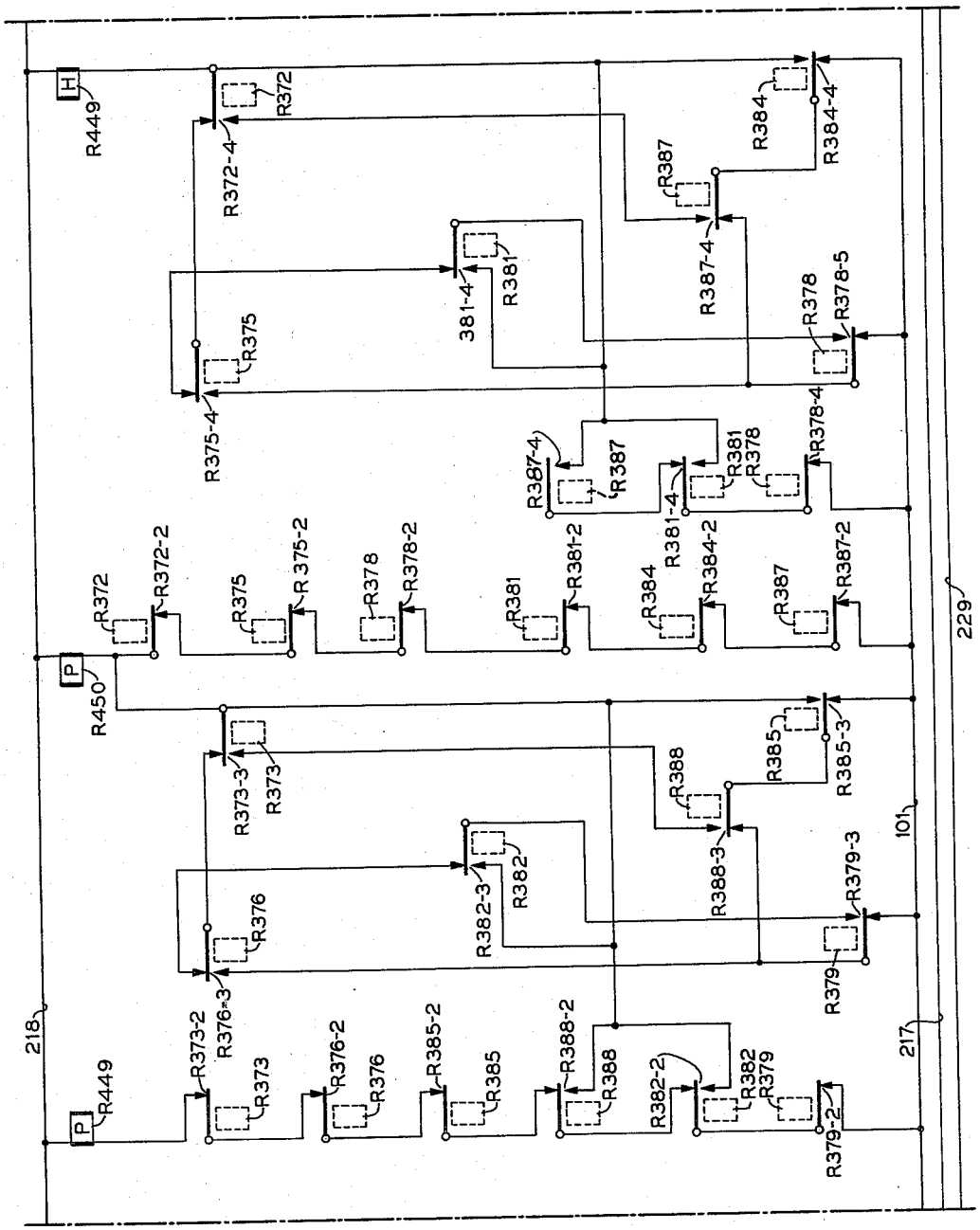
Figure 6G:
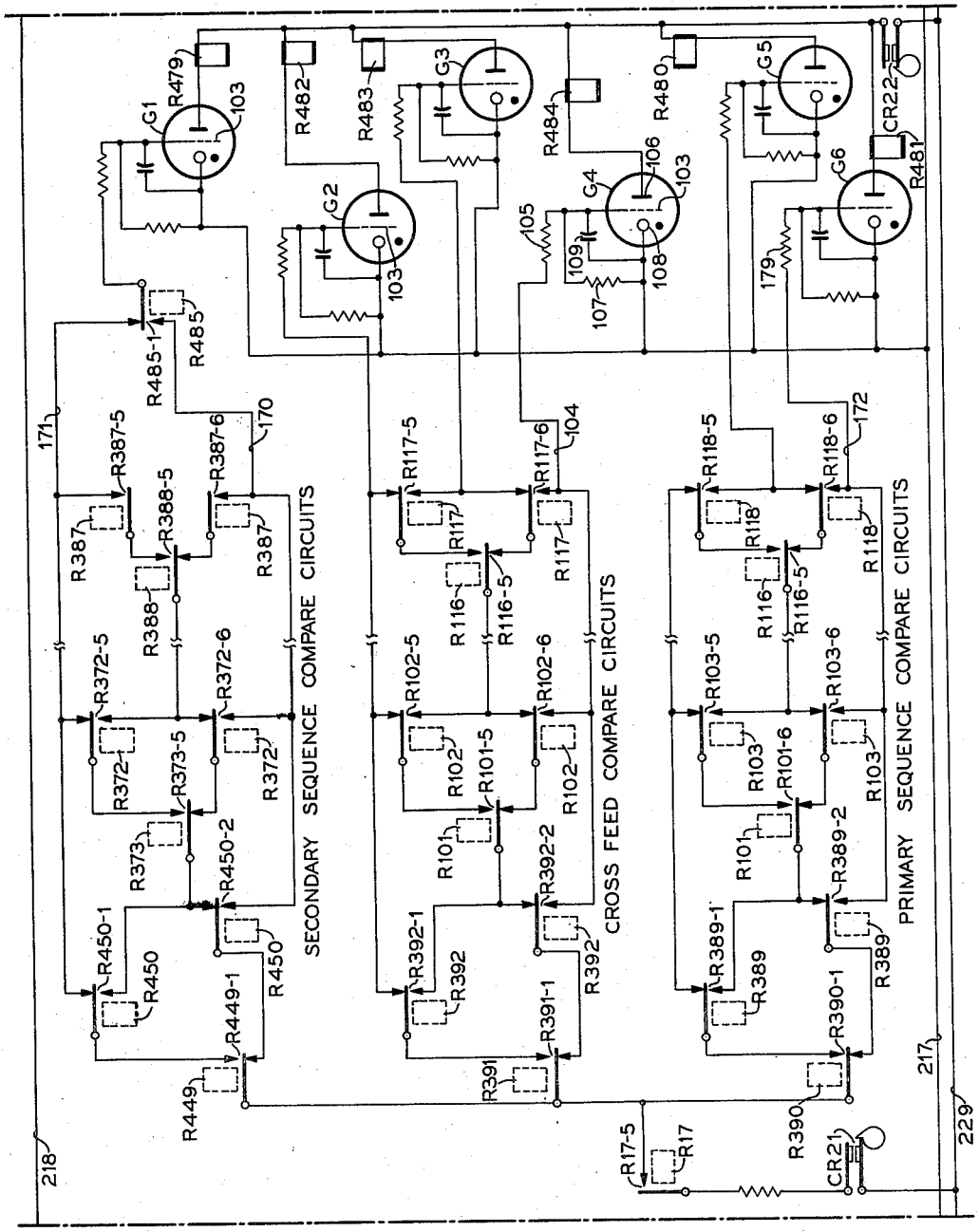

The primary feed and the secondary feed control unit represented by block 195 (see FIG. 5) includes correction relay contacts and code relay contacts in circuits which direct test cam impulses to the data compare control relays represented by block 196 and shown in detail in FIG. 6g. The aforesaid control relays are picked to indicate the relative magnitude of various data being compared so as to provide high, low or equal data comparison results. The data compare control relay contacts represented by block 197 (FIG. 5), govern the operation of the primary, the eject, and the secondary record card feed clutches represented by block 198, so that the primary and/or the secondary record cards may be advanced through their respective feed units. In keeping with what has already been stated hereinbefore, the said feed clutches are operated along with the card distributing apparatus, also a part of block 198, according to certain operational rules.

CODE CONFIGURATION

Figure 4:
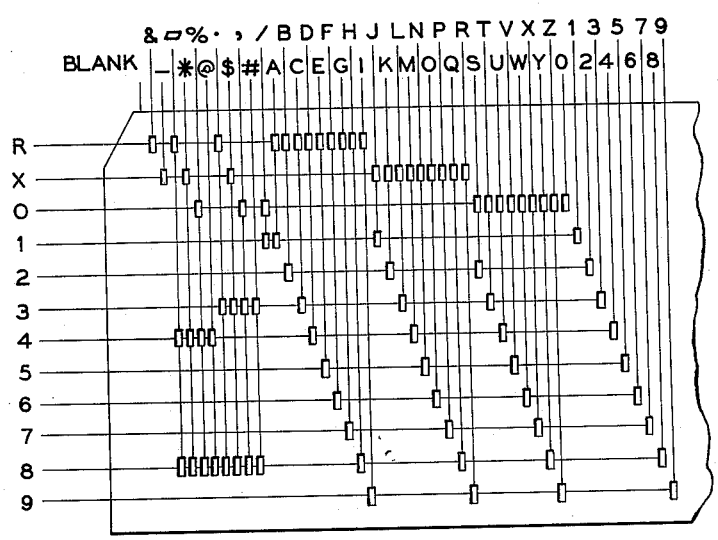
FIG. 4 is a partial view of a record card having holes punched therein to represent, in code configuration, the data for controlling the sorting-by collation machine.

The record cards are of a common type used in tabulating machines and related apparatus. They may be punched with alphabetic, numeric or special symbol data as is shown in FIG. 4. The card in FIG. 4 is punched with all the possible characters required to be designated in the particular combinational code employed in conjunction with the preferred embodiment.

A card column has twelve index positions; namely, 9, 8, 7 . . . 1, 0, X, and R. A single perforation in a column, index position R for example, designates the & symbol. Other special symbols may be represented by combinational perforations in a single column, such as R-8-3 for example. A single perforation in a column in one of the positions 0 to 9 represents the corresponding numeral 0 to 9. A perforation in index position R which is combined with a perforation in one of the numeral positions 1 to 9 represents one of the letters A to I, respectively, whereas an X-hole combined with one of the perforations in positions 1 to 9 represents one of the letters J to R, respectively, and a 0-hole combined with a perforation in one of the positions 2 to 9 represents one of the letters S to Z, respectively.

The index positions 0, X and R are called the zone positions, and the index positions 1 to 9 are referred to as numeric positions. It is to be observed that a perforation in the 0 position when unaccompanied by another perforation in the same column is representative of the cipher, but when accompanied by a perforation in one of the positions 2 to 9 is part of an alphabetic letter representation. Also, the X-hole, alone, represents a dash, but together with a numeric hole the combination of holes is representative of an alphabetic letter. In other words, the zone holes as well as the numeric holes vary in significance depending upon whether they occur singly or in combination.

All of the symbols have a prescribed order of magnitude within a chosen scale of values. The ascending order of magnitude is as follows:
 (1) Blank column.
 (2) Special symbols in the order R-3-8, R-4-8, R, X-3-8, X-4-8, X, 0-1, 0-3-8, 0-4-8, 3-8, and 4-8.
 (3) Letters A to Z.
 (4) Numbers 0 to 9.

Thus, since the cards are placed in hoppers PH (FIG. 1) and SH face down with the 9 index position leading, an example of cards sorted by the present sorting-by-collation machine in ascending order is given below:

```
AAF628430
AAF628432
AAG179540
EX38141-1300
EX3814170000
100$D3-17500
1001D5-68000
1035D3000000
```

CARD FEED MECHANISM

Figure 1:
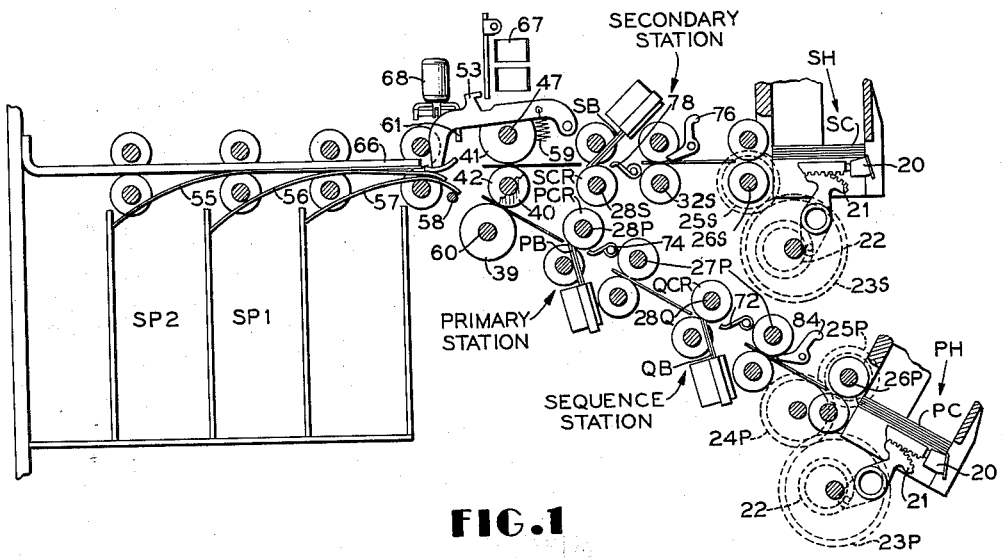
FIG. 1 is a somewhat diagrammatic view of a record card controlled sorting-by-collation machine for handling two sets of record cards.
Figure 2:
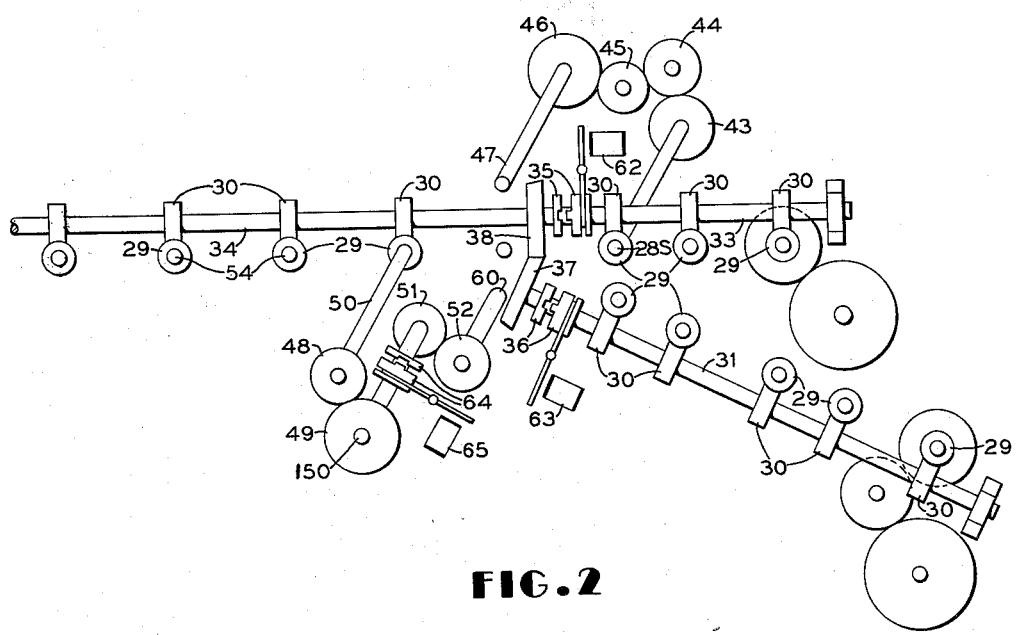
FIG. 2 is a somewhat diagrammatic view of the drive mechanism for said sorting-by-collation machine.

FIGS. 1 and 2 diagrammatically show the mechanical structure of the machine. Cards placed in primary hopper PH are designated PC and called primary cards, whereas cards in secondary hopper SH are designated SC and referred to as secondary cards. Pickers 20 are adapted to feed cards out of the hoppers. The pickers have rack teeth meshed with gear segments 21 which are oscillated by box cams 22 rigid with gears 23P and 23S. Gear 23P, in the primary side, is driven through an idler 24P by a gear 25P on a shaft 26P. Gear 23S, in the secondary side, is driven directly by a gear 25S on a shaft 26S. Shaft 26P and two similar shafts 27P in the primary side are feed roller shafts. These shafts and two contact roll shafts 28Q and 28P in the primary side are driven through spiral gear pairs 29 and 30 by the primary shaft 31. Shafts 26S and 32S in the secondary side are feed roll shafts, and these and a contact roll shaft 28S in the secondary side are driven by similar spiral gear pairs 29 and 30 from the secondary shaft 33. Shaft 33 may be clutched to continuuosly rotating main shaft 34, by a one-revolution clutch 35 brought into action by clutch magnet 62. Similarly, primary shaft 31 is clutchable by a one-revolution clutch 36 to a bevel gear 37, upon energization of clutch magnet 63. Bevel gear 37 is meshed with a bevel gear 38 on main shaft 34. Contact roll shaft 28Q, in the primary side, carries contact roll QCR coacting with sensing brushes QB to sense primary cards passing through the sequence station. The contact roll shaft 28P, in the primary side, carries contact roll PCR coacting with sensing brushes PB to sense primary cards traversing the primary station. The shaft 28S, in the secondary side, carries a contact roll SCR which engages brush SB to sense secondary cards as they traverse the secondary station.

With primary shaft 31 in operation, the related picker 20 will feed a card from the hopper PH. The card will be fed further by the feed rollers in the primary side to eject rolls 39 and 40. With secondary shaft 33 in operation, a card will be fed from the hopper SH by a related picker 20 and then by the feed rollers to the eject rolls 41 and 42. The eject rolls 41 and 42 are driven by the secondary shaft 33 through a train of gears 43, 44, 45, and 46, of which gear 43 is secured to secondary contact roll shaft 28S and gear 46 to shaft 47 of eject roll 41. The primary eject rolls 39 and 40 are driven by the main shaft 34 through means including a one-revolution clutch 64 which is effective upon energization of eject magnet 65. The driver element of the clutch carries a gear 48 meshed with a gear 49 on a shaft 150 which is driven through a spiral gear pair 29 and 30 by the main shaft 34. The driven element of the clutch carries a gear 51 meshed with a gear 52 on shaft 60 for eject roll 39 (see also FIG. 1).

Shaft 50 and two more, similarly driven shafts 54, carry feed rollers on companion shafts to feed the cards issuing from the eject rolls to a selected card pocket. There are two pockets, designated SP1 and SP2, to which the cards may be selectively distributed. There are three guide blades 55, 56 and 57 for directing cards to selected pockets. Blade 57 rests at the rear upon stop 58. Blade 55 is shaped to conform with guide bar 66, and the rear end of blade 55 is substantially even with the end of the guide bar. The rear end of blade 56 extends under the toe of a lever 53 associated with magnet 67. With magnet 67 de-energized, cards SC issuing from eject rolls 41 and 42 feed over blade 57 and under blade 56 into pocket SP1. Similarly, primary cards PC issuing from eject rolls 39 and 40 while magnet 67 is de-energized, feed under blade 56 and over blade 57 into pocket SP1. Blade 56 is depressed at the rear end by lever 53, as is shown in FIG. 1, to allow cards issuing from eject rolls 41 and 42 and/or 39 and 40 to pass over this blade and under blade 55 into pocket SP2, when magnet 67 is energized since armature 79 is moved counterclockwise and unhooks the lever 53 associated therewith, allowing attached spring 59 to rock the lever counterclockwise. Consequently, blade 56 is depressed, and a card issuing from the eject rolls will pass over this blade into pocket SP2.

As will be described in greater detail hereinafter, reset solenoid 68 (see also FIG. 3), when energized, raises reset lever 61, whereupon lever 53 is hooked onto the armature of magnet 67.

Figure 6H:
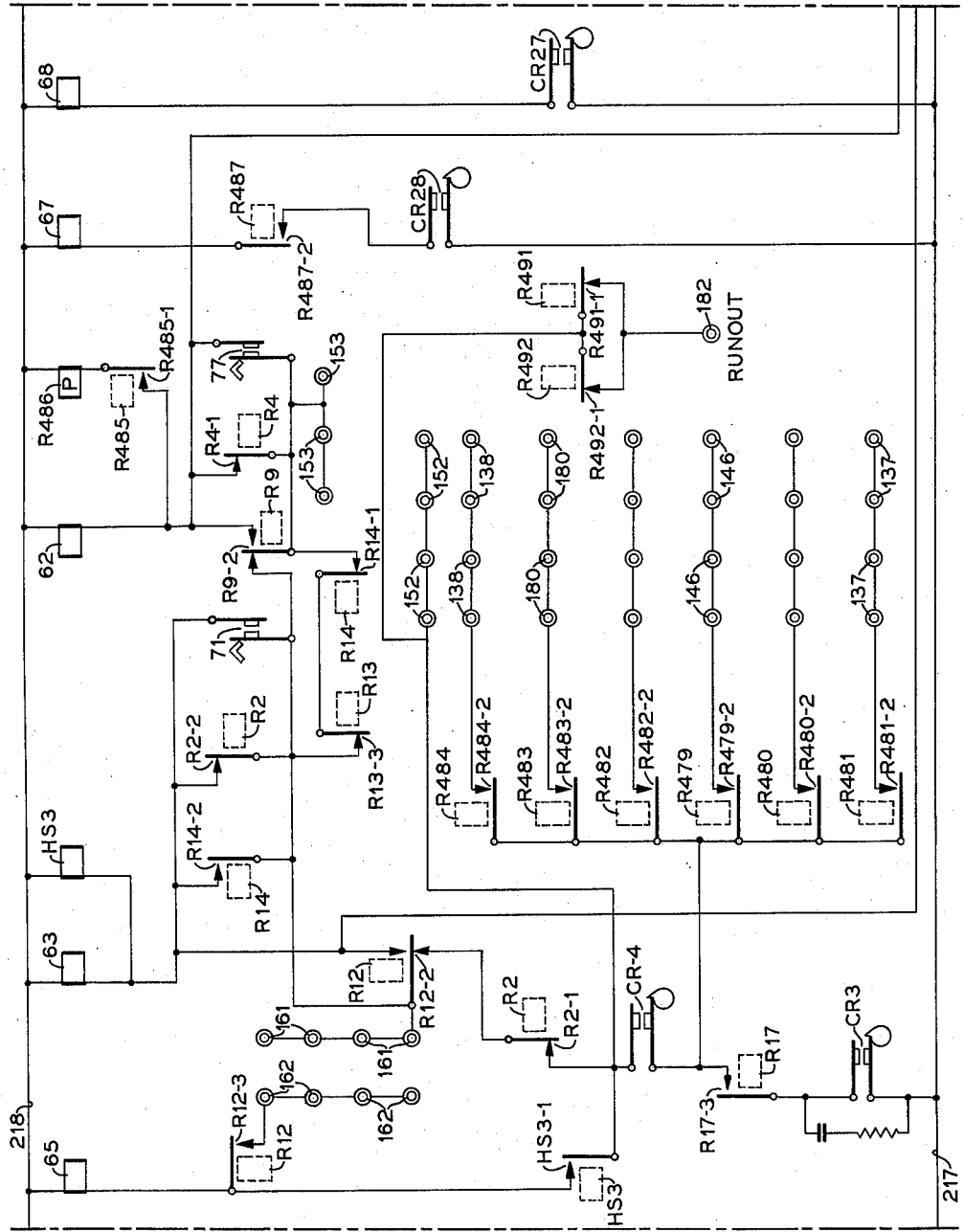

There are various card lever contacts, hopper contacts, cam contacts, etc., shown in the circuit diagrams (FIGS. 6a to 6k). Briefly, as long as cards are in hoppers PH and SH (FIG. 1), hopper contacts 69 and 70 (FIG. 6c) are held open and magnets R1, R2, R3, and R4 remain unenergized. During a first cycle of primary shaft 31 (see FIGS. 1 and 2), a first card PC will feed out of hopper PH to a position past the second pair of feed rolls in the primary side and behind the sequence station. In advancing to this position, the card rocks a lever 84 to close contacts 71 (FIG. 6h). During a second cycle of shaft 31, the second card PC feeds from the hopper PH while the first card is advanced through the sequence station. During this advance, the first card rocks a lever 72 (FIG. 1) to close contacts 223 (FIG. 6c). During a third cycle of shaft 31, the first card is advanced through the primary station to the eject rolls 39 and 40. In its advance through this station, the card operates a second lever 74 (FIG. 1) to close contacts 225 (FIG. 6c). Continuation of the feed of the card from the eject station to a selected card pocket SP1 or SP2 will depend upon the energization of eject magnet 65.

During a cycle of secondary shaft 33 (FIG. 2), a card SC is fed from the hopper SH (FIG. 1) to a position behind the secondary station, meanwhile operating a lever 76 in the secondary feed line to close contacts 77 (FIG. 6h). During a following cycle of shaft 33, the card SC will be fed through this sensing station to the eject rolls 41 and 42, meanwhile operating card lever 78, in the secondary side, to close contacts 224 (FIG. 6c). During a third cycle of shaft 33, the card will be fed to a selected card pocket SP1 or SP2.

Various cam contacts shown in the circuit diagrams are of three classes. One class comprises continuously operating cam contacts including those given the general designation CR and, also, the circuit breaker contacts given the general designation CB. A second class includes contacts operated only when the primary shaft 31 is running, and cam contacts in this class have the general designation P. The third class includes contacts operating only when the secondary shaft 33 is running, and these cam contacts have the general designation S. Several relays are of the common type having pick-up and hold coils operating on the same armature contacts. The pick-up coil will be identified by a letter P inside the box representing the coil. The hold coil will be identified by a similarly placed letter H. Other relays also of a common type, have latch-pick and latch-trip coils operating on the same armature contacts. As is well known, energization of the latch-pick coil causes the armature to latch mechanically in an operated status, whereas energization of the latch-trip coil causes the armature to unlatch and return to on unoperated status. The latch-pick coil will be identified by letters LP inside the box representing the coil. The latch-trip coil will be identified by similarly placed letters LT.

POCKET SELECT MECHANISM

As mentioned hereinbefore, there are two pockets SP1 (FIG. 1) and SP2 to which the cards may be selectively distributed, and there are three guide blades 55, 56, and 57 for directing the cards to one of the selected pockets. Blade 57 rests at one end on stop 58, whereas blade 55 is shaped to conform with guide bar 66. The rear end of blade 55 is substantially even with the end of the said guide bar. The rear end of blade 56 extends under the toe of the lever 53 associated with magnet 67.

Figure 3:
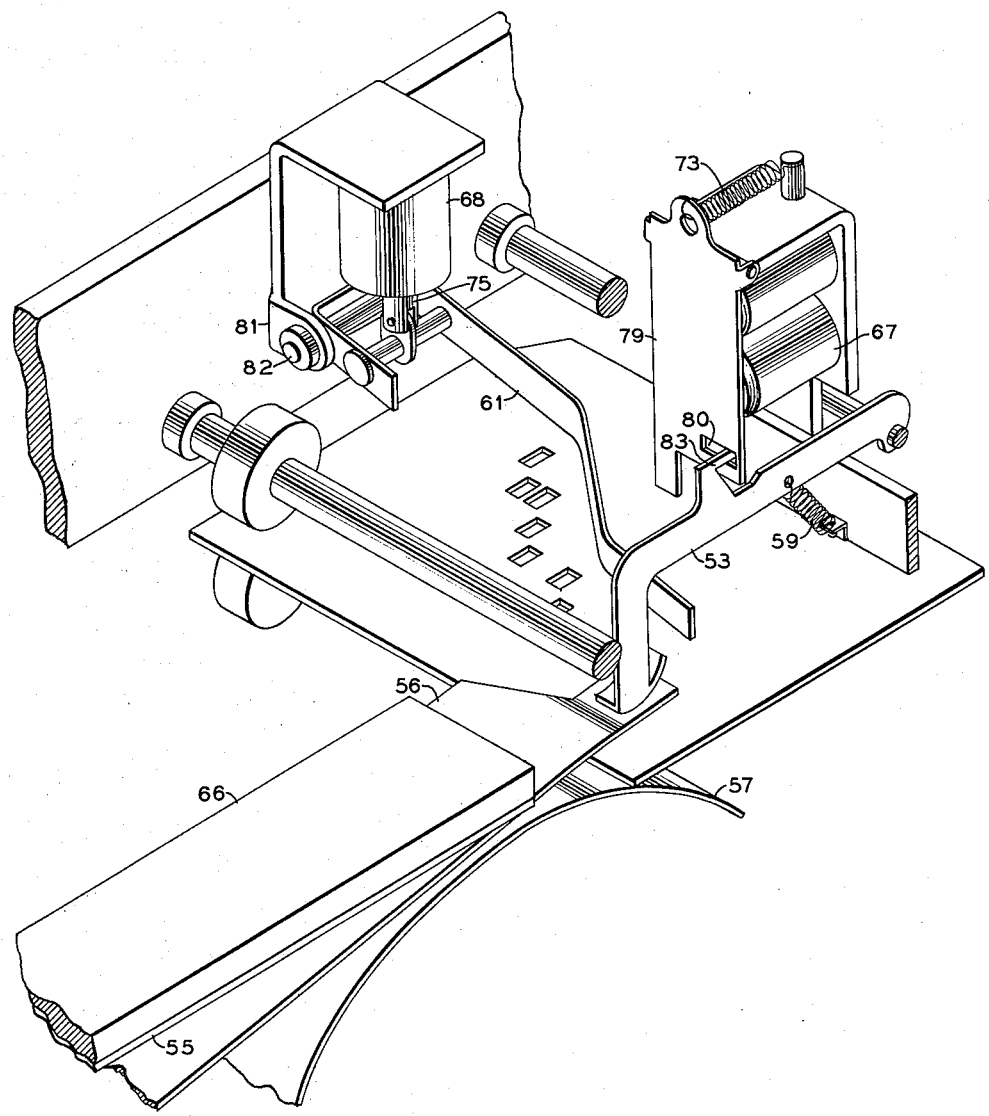
FIG. 3 is a perspective view of the card distributing mechanism.

Referring to FIG. 3, when magnet 67 is de-energized, armature 79 with latch slot 80 therein is biased to its clockwise limit under the urging of armature return spring 73. At this time, projection 83 of lever 53 is hooked onto armature 79 at latch slot 80, whereby the end of guide blade 56 is permitted to rise due to its inherent resiliency above the secondary card feed line (see also FIG. 1). Consequently, cards SC and PC issuing from eject rolls 41 and 42, and/or 39 and 40, respectively, feed under blade 56 and over blade 57 into pocket SP1. With magnet 67 (FIG. 3) energized, however, projection 83 of lever 53 is unhooked from armature 79, and lever 53 is urged in a counterclockwise direction by spring 59. Thus, the end of blade 56 is depressed to allow cards SC and PC feeding from eject rolls 41 (FIG. 1) and 42, and/or 39 and 40, respectively, to pass over this blade and under blade 55 into pocket SP2.

Core 75 (FIG. 3) of reset solenoid 68 is connected to reset lever 61 which, in turn, is pivotally connected to the solenoid frame 81 by the stud shaft 82. With solenoid 68 de-energized, the end of reset lever 61 is sufficiently below lever 53 so that when magnet 67 is de-energized, said lever 53 will not engage the end of reset lever 61. However, with solenoid 68 energized, the end of reset lever 61 is moved to engage the lever 53 so as to move the latter lever in a clockwise direction, whereupon projection 83 of lever 53 is caused to hook onto armature 79 at latch slot 80.

Furthermore, when solenoid 68 is energized, blade 56, due to its own resiliency, is free to move above the secondary card feed line so that cards issuing from the aforementioned eject rolls feed under blade 56, over blade 57 and into pocket SP1. As the description advances, the circuits relating to the pocket select mechanism will be described in detail.

RUN-IN START CIRCUIT DESCRIPTION

*First feed cycle*

Assuming suitable electrical power is applied from the negative and positive terminals of separate 40 and 115 volt sources to voltage terminals 110 (FIG. 6a)—113, e.g., −40 volts, +40 volts, −115 volts, and +115 volts, respectively, so that power is on voltage lines 217, 218, and 229, and assuming cards are present in primary hopper PH (FIG. 1) and secondary hopper SH, operation of the machine is initiated by depressing a start key (FIG.

6c). The closure of start key contacts 219 establishes the following circuit:

*Initiating start key circuit.*—From the +40 volt line 217 through cam contacts CR1, stop key contacts 220, start key contacts 219, relay contacts R21–1, R1–1 or R3–1 and R12–1 or R8–2, and coil R17P, to the other side of the line. Contacts R17–1 are now closed, and together with cam contacts CR2 establish the circuit of coil R17H to maintain relay R17 picked.

Relay contacts R17–3 (FIG. 6h) also close, and the following circuit is then completed:

*Primary feed magnet 63 and HS3 circuit No. 1.*—From the +40 volt line 217 through cam contacts CR3, relay contacts R17–3, cam contacts CR4, relay contacts R2–1, R12–2 normally closed (n/c), R2–2, and primary feed magnet 63 and magnet HS3, to line 218. Magnet HS3 causes contacts HS3–1 to close, whereby the following circuit is completed:

*Eject magnet 65 circuit No. 1.*—The +40 volt line 217 through contacts CR3, R17–3, CR4, HS3–1, and eject magnet 65, to the other side of the line.

The contacts R17–3, when closed, also cause the following circuit to be completed:

*Secondary feed magnet 62 circuit No. 1.*—The +40 volt line 217 through contacts CR3, R17–3, CR4, R2–1, R12–2 n/c, R9–2 n/c or R13–3 and R14–1, R4–1, and secondary feed magnet 62, to the other side of the line.

The clutch magnets 62 and 63 having been energized, secondary and primary card feed cycles ensue. During a primary cycle, a card PC is fed from hopper PH (FIG. 1) to a position just behind the first primary card lever 72. During the secondary card cycle, a card SC is fed from hopper SH to a position just behind the secondary card lever 78.

As stated previously, the eject clutch magnet 65 has been energized whereby eject rolls are operated, but no card is present at the eject station at this time. Had a card been present, it would have been ejected to a select one of the pockets SP1 or SP2.

*Second feed cycle*

Cam contacts CR2 (Fig. 6c) open before the first primary and secondary feed cycles end, and accordingly, coil R17H is de-energized. The second primary and secondary cycles must be initiated in the same way as are the first cycles initiated, i.e., coil R17P is energized through start key contacts 219. Coil R17H, then becomes energized once again via cam contacts CR2 after which the other circuits traced hereinbefore, are established. During the second primary and secondary card feed cycles, the second cards in each feed are fed out of the hoppers PH and SH (Fig. 1), while the first primary and secondary cards are fed through the sequence and secondary sensing stations, respectively. The first primary card stops just behind the second primary card lever 74, meanwhile having acted on the first primary card lever 72 to close contacts 223 (FIG. 6c). The first secondary card stops ahead of the rear end of chute blade 56 (see also FIG. 1), meanwhile having acted on the secondary card lever 78 to close contacts 224 (FIG. 6c). Accordingly, circuits are established as follows:

*Coil R5P circuit.*—From the + 40 volt line 217 through contacts CR5, contacts 224, and coil R5P, to the other side of the line.

*Coil R7P circuit.*—The +40 volt line 217 through contacts CR5, coil R7P via contacts 223, to line 218.

The coil windings R5H and R7H are then energized via the respective stick contacts R5–1 and R7–1, and cam contacts CR6.

During the secondary card feed cycle, cam contacts S2 close and together with contacts R5–2 (now closed), establish the circuit of parallel coils R8 and R9. Contacts R8–1 thereupon close to effect a hold circuit for maintaining these relays picked after contacts R5–2 open.

During the primary cycle, cam contacts P2 close and in conjunction with contacts R7–2 establish the circuit of parallel coils R14 and R15, whereupon contacts R15–1 close to maintain the circuit in effect after contacts R7–2 open.

*Third feed cycle*

The start key is held down to allow operations to continue, whereupon a third primary cycle will occur. The third secondary cycle will not occur at this time, because relays R9 (FIG. 6c) and R14 remain energized at the completion of the preceding cycle via cam contacts S2 and P2, respectively, to maintain contacts R9–2 (FIG. 6h) and R14–1 transferred. Thus, the secondary feed magnet 62 circuit No. 1, previously traced, is unable to make. No other circuit can be made at this time through magnet 62, and a third secondary cycle does not occur.

During the third primary cycle, a third card PC is fed from hopper PH (FIG. 1), the second card PC is fed to the second cycle position, and the first card PC is fed through the primary sensing station to the eject rolls. On its way, the first primary card acts on the second primary card lever 74 to close contacts 225 (FIG. 6c), to thereby establish the following circuit:

*Coil R6P circuit.*—The +40 volt line 217 through cam contacts CR5, contacts 225, and relay R6P, to the other side of the line. Contacts R6–1 then close, to thereupon energize coil R6H upon closure of cam contacts CR6. Meanwhile, cam contacts P2 close and with contacts R6–2 establish the circuit of parallel relay coils R12 and R13. Contacts R13–1 then close to effect a hold circuit after contacts R6–2 open. It should be noted, too, that during the third primary card feed cycle, the second primary card PC is acted upon in the same way as the first primary card was acted upon in the preceding cycle, to bring about the energization of relays R7, R14 and R15.

After the third primary cycle, relay coil R17H remains energized so that the start key may be released. The circuit for coil R17H will be maintained through cam contacts CR2 and relay contacts R17–1 as described previously, and during the interval in which contacts CR2 are open, the following alternate circuit will be established.

*Coil R17H hold circuit.*—The +40 volt line 217, cam contacts CR1, stop key contacts 220, relay contacts R35–1, R13–2 normally open (n/o), R15–2, R1–3 n/c, R9–1 n/o, R3–2 n/c, safety contacts 226, and relay contacts R17–2, coil R17H, to line 218.

It is to be observed that since at this point relays R12 and R8 are energized, the initiating start key circuit cannot be re-established. Should the coil R17H hold circuit be broken as by temporarily opening the step key contacts 220, for example, the circuit of coil R17H may be re-established by again depressing the start key. A circuit will thereupon be established through coil R17H which is the same as the R17H hold circuit except that it is routed via start key contacts 227 which shunt contacts R17–2.

Since contacts R9–2 (FIG. 6h), R12–2 and R14–1 are now operated, the secondary feed magnet 62 circuit No. 1, previously traced, is unable to make. Whether an alternative circuit will make through magnet 62 depends on the plugboard wiring and on the result of card control data comparison, which will be explained as the description advances. The relay R12 (FIG. 6c) is energized during the third primary cycle at a time preceding a closure period of cam contacts CR3 (FIG. 6h). Accordingly, the previous circuits traced through primary feed magnet 63 and magnet HS3 cannot make, since contacts R12–2 are now shifted. Whether or not a new primary feed cycle shall be performed will depend on both plugboard wiring and card comparison, all to be explained as the description advances.

GENERAL CIRCUIT DESCRIPTION

Coding circuits

To afford comparison of blank column data, special character data, alphabetic and numeric data, all data is read from the record cards at the various reading stations and set up in one or more so-called code relays. There are six different code relays associated with each comparing position of the primary, secondary, primary sequence, first secondary sequence, and second secondary sequence read-in units 120 to 124 (see FIG. 6b), respectively. It should be added here that although only one comparing position is shown in FIG. 6b, any number, such as sixteen for example, may be used. These code relays are in effect storage relays, the energization of which is dependent upon the coincident timing of reading station card controlled brush impulses and the energization of coding impulse relays R453 (FIG. 6a), R457, R461, R465, R469 and R473. The coding impulse relay contacts, e.g., R453-1 (FIG. 6b), R457-1, etc., are each connected in series circuit with a pick coil of a related code relay, e.g., relays R101, R104, etc., and are timed to close so that select code relays are energized for each index hole punched in the card. As is shown in FIG. 6a, the aforesaid coding relays are energized each machine cycle through their respective cam contacts CR7 to CR12 and relay contacts R17–4. Contacts CR7 through CR12 close as shown in FIG. 7 at the following times, respectively (11,12), (0,12), (4, 3, 2, 1), (7, 6, 5, 2, 1), (8, 5) and 9, 6, 3, 1).

Referring to FIG. 6b the screen grids 90 of each of the vacuum tubes V1 to V5 are normally connected to the −40 volt line 218 through their respective restore interlock relay contacts R11–1 n/c, R10–1 n/c, R40–1 n/c, R41–1 n/c and R19–1 n/c. Similarly, each of the control grids 91 is connected to the −40 volt line 218 through a resistor 92, thereby placing the control grid 91 at 40 volts minus with respect to the cathode 93 which is connected directly to the +40 volt line 217. When the restore interlock relay contacts, e.g., R11–1, transfer so as to make on the n/o side, the associated screen grid 90 is connected to the +115 volt line 229 via resistor 89 and a parallel capacitor 94.

Assuming, for example, that hub 95 which is connected to control grid 91, is also connected by plug wire to primary card reading station column 1 reading brush hub 96 (FIG. 6a), and assuming that a primary card PC having a 5-hole therein in the card column to be read by the reading brush PB connected to hub 96 is fed through the primary reading station, a 5-timed impulse will be transmitted to control grid 91 (FIG. 6b) at 72° to 78° (FIG. 7), via a circuit from the +40 volt line 217 (FIG. 6a), through cam contacts CR13, CB1 or CB2 and CB3 or CB4, relay contacts R6–3 n/o, contact roll PCR, and the plug wire connecting hubs 95 and 96, to control grid 91 (see also FIG. 6b). If, at this time, relay contacts R11–1 (FIG. 6b) are engaged in the n/c position, vacuum tube V1 will not conduct. However, if the said contacts are made in the n/o position so that screen grid 90 is connected to the +115 volt line 229, vacuum tube V1 will be rendered conducting. Consequently, any of the code relays connected to plate 97 whose associated coding relay contacts are closed at this time, will be energized. As is shown in FIG. 7, cam contacts CR10 (see also FIG. 6a) and CR11 are closed at 5-time so as to energize coding impulse relays R465 and R469, respectively. Hence, when tube V1 is rendered conducting at 5-time due to the 5-hole punched in the primary card PC, code relays R110 (FIG. 6b) and R113 are energized through their respective coding relay contacts R465–1 and R469–1.

It is to be observed that operation of the vacuum tubes V1 to V5 is, in effect, under control of the afore-mentioned restore interlock relays R11, R10, R40, R41 and R19, respectively, the operation of which will be described in detail hereinafter. To avoid undue prolixity, the circuits associated with vacuum tubes V2 to V5 will not be described in detail because each operates in the same manner as that associated with vacuum tube V1 already described hereinabove.

The code relay hold coil circuits are shown in FIG. 6d, wherein the one having cam contacts CR14 therein is associated with the circuits of first secondary sequence tube V3 (see also FIG. 6b); the one having cam contacts CR15 therein is associated with second secondary sequence tube V4; that having cam contacts CR16 therein is associated with secondary tube V5; the circuit having cam contacts CR17 therein is associated with primary tube V1; and the circuit having cam contacts CR18 therein is associated with primary sequence tube V2. Thus, carrying on with the example, after relays R110 (FIG. 6b) and R113 are energized at 5-time, their respective hold coils (not shown) are energized through parallel cam contacts CR17 (FIG. 6d) and relay contacts R37–1.

Inasmuch as it is necessary to energize the code relay hold coils as rapidly as possible due to the fact that the impulse directed to the code relay pick coils is of short duration, a hold coil pre-energization circuit is provided as is shown in FIG. 6d. Each of the pre-energization circuits for the hold coils connected in series with cam contacts CR14, CR15 and CR16, is formed through cam contacts CR19 and relay contacts R5–4 which are associated with the secondary feed, whereas those connected in series with cam contacts CR17 and CR18 are formed through their respective contacts R6–4, R7–4 and CR19. A pre-energization circuit for a code relay hold coil, for example coil R103H, is from +40 volt line 217 through coil R103H, resistor 98, relay contacts R7–4, and cam contacts CR19, to the other side of the line. When contacts R103–1 close after relay R103 is picked, resistor 98 is shunted and coil R103H is connected directly to the 40 volt source via contacts CR18.

Correction circuits

The code relays such as R101 (FIG. 6b), R104, R103, R106, etc., will do for comparison of alphabetic and numeric characters. However, to afford a satisfactory comparison of blank column data, special characters, and alphabetic or numeric characters, so-called correction relays are required. As is shown in FIGS. 6e and 6f, and to be described shortly, these correction relays R389, R390, R391, R392, R449 and R450 are selectively energized through circuits formed by the contacts of the code relays.

Assuming that a secondary card SC having combinational R–1 holes punched therein to represent the character A, traverses the secondary reading station while a primary card PC having a 5-hole therein to represent the numeral 5, traverses the primary reading station, and assuming hubs 95 (FIG. 6b) and 96 (see also FIG. 6a) are connected by a plug wire as are hubs 99 and 100, the following circuits will be effective to render the appropriate correction circuits effective:

*Primary code relays R110 and R113 pick circuits.*—Due to the fact that coding relays R465 (FIG. 6a) and R469 are energized at 5-time, the circuits to energize code relays R110 (FIG. 6b) and R113 will form at 5-time from the +115 volt line 229 (FIG. 6b), through contacts R465–1 and R469–1, tube V1, to line 217.

*Code relays R110 and R113 hold circuits.*—The +40 volt line 217 (FIG. 6d) through coils R110H and R113H (not shown), their respective contacts R110–1 and R113–1 (not shown), cam contacts CR17 or relay contacts R37–1, to the other side of the line.

*Secondary code relays R102 and R105 pick circuits.*—Due to the fact that relays R453 (FIG. 6a) and R457 are energized at R or 12-time, a circuit will form at this time to energize code relays R102 (FIG. 6b) and R105 from the +115 volt line 229 through relay contacts R453-5 and R457-5, tube V5, to line 217.

*Secondary code relays R108, R111 and R117 pick circuits.*—At 1-time, a correspondingly timed brush impulse is transmitted through the afore-described secondary reading station circuit (see FIG. 6a) and hub 99 (FIG. 6b) to cause energization of relays R108, R111 and R117 from line 229 through contacts R461-5, R465-5 and R473-5, tube V5, to the other side of the line.

*Code relays R102, R105, R108, R111 and R117 hold circuits.*—Referring to FIG. 6d, the aforementioned hold coils are energized through respective stick points, and parallel cam contacts CR16 and relay contacts R38-1.

*Correction relays R391P and R392H pick circuits.*—In view of the fact that primary and secondary code relays R102, R105, R108, R110, R111, R113 and R117 are energized when cam contacts CR20 (FIG. 6e) close at 206°, coils R391P and R392H are energized through the following circuits:

*Relay R391P.*—The +40 volt line 217 through cam contacts CR20, relay contacts R17-6, R114-3 n/c via wire 101, R117-3 n/o, and R102-3 n/o, coil R391P via wire 102, to line 218.

*Relay R392H.*—The +40 volt line 217 through cam contacts CR20, relay contacts R17-6, R107-4 n/c via wire 101, R116-4 n/c, and R113-4 n/o, coil R392H, to the other side of the line.

It is to be observed that the primary correction relay coil R391P is energized through the contacts of the secondary code relays, whereas the secondary correction relay coil R392H is energized through the primary code relay points.

The primary and secondary cross-feed compare correction relay contacts R391-1, R392-1 and R392-2 are shown in FIG. 6g. When comparing data derived from denominationally related card columns for relative magnitude, it is required that the relation of the values in the higher denominations dominate the relation of values in the lower orders. Comparison circuits, each for a different denomination, are therefore connected in tandem to control comparison result means. However, if any of the higher order circuits indicate that one control value is greater than the other, then current is led directly from this circuit to the result means, by-passing the succeeding comparing circuits. It may be seen that the correction relay contacts are in the highest order position of each denomination circuit so that the transfer of either set of contacts, for example contacts R391-1, R392-1 and R392-2, will cause the impulse transmitted through cam contacts CR21 to bypass the succeeding compare circuits. However, when all of the correction contacts transfer concurrently as in the example described hereinabove, the comparison circuits are not by-passed, and the aforesaid impulse is transmitted through the code relay contacts of the feed control comparing test circuit.

*Feed control comparing test circuit.*—Due to the fact that primary and secondary code relays R102, R105, R108, R110, R111, R113 and R117, and correction relays R391P and R392H, are all energized as a result of the reading of a 5-hole in the primary card and the combinational R-1 punching in the secondary card, a circuit will form when cam contacts CR21 close to apply a positive voltage to starting anode 103 (FIG. 6g) of gas tube G4 from the +115 volt line 229, through cam contacts CR21, relay contacts R17-5, R391-1 n/o, R392-1 n/o, R101-5 n/c, and R102-6 n/o, resistor 105 via wire 104, to starting anode 103 of gas tube G4.

The gas tube circuit operates in a fashion similar to the vacuum tube circuit described previously. The +115 volt line 229 is connected to anode 106 through cam contacts CR22 and a feed control relay, such as relay R484 for example. A resistor 107 connects starter anode 103 to ground potential when the anode is not being impulsed. Resistor 105 is connected in series with, and intermediate the feed control comparison test circuit and the starter anode 103. It is a current limiting resistor to prevent damage to starter anode 103. A capacitor 109 is connected between starter anode 103 and cathode 108 to eliminate transients.

When a test impulse through cam contacts CR21 is applied to starting anode 103, the gas in the tube, preferably a type 0A4G gas tube, is ionized and conduction starts from cathode 108 to anode 106, whereby relay R484, connected to the +115 volt line 229 via cam contacts CR22, is energized. Once the tube starts to conduct, ionization of the gas within the tube will continue to cause the tube to conduct until the circuit to anode 106 is broken.

As will be described in detail hereinafter, the contacts of feed control relays R479, R482, R483, R484, R480 and R481 determine, in part, the forming of circuits to secondary feed magnet 62 (FIG. 1), primary feed magnet 63, and eject magnet 65 which, in turn, determine whether or not secondary and/or primary feed cycles will ensue. In addition thereto, the contacts of the aforesaid feed control relays form the circuits to determine into which of the pockets SP1 and SP2 the cards PC and SC issuing from the eject rolls, will feed.

RUNOUT CIRCUIT

When the last primary card is moved out of the primary hopper PH (FIG. 1) to a position just ahead of the sequence reading station, relay R17 will drop out as a result of the energization of primary hopper relays R1 and R2, and the machine will stop. It is necessary to depress the runout key in order to repick relay R17 so as to resume machine operations. During the next primary feed cycle after resumption of machine operation, the last primary card will feed through the primary sequence reading station to a position just ahead of the primary reading station, whereas during a subsequent primary feed cycle the last primary card will pass through the primary reading station to the primary feed eject position. During the aforesaid subsequent feed cycle, relay R7 (FIG. 6c) is de-energized when the primary sequence card lever contacts fail to make. As a result, a hot 9 impulse is automatically directed to and read into the primary sequence read-in unit 122 via the read-in circuits. Furthermore, relays R14 and R15 are de-energized when cam contacts P2 separate. During the last primary feed cycle, the last card PC will be ejected into one of the stacker pockets, and relay R6 (FIG. 6c) will be caused to drop out when the primary feed contacts 225 fail to make. As a result, a hot 9 impulse is automatically entered into primary read-in unit 120 through the circuit including contact R6-3 n/c (FIG. 6a) therein. Relays R12 and R13 drop out when cam contacts P2 separate.

Figure 6J:
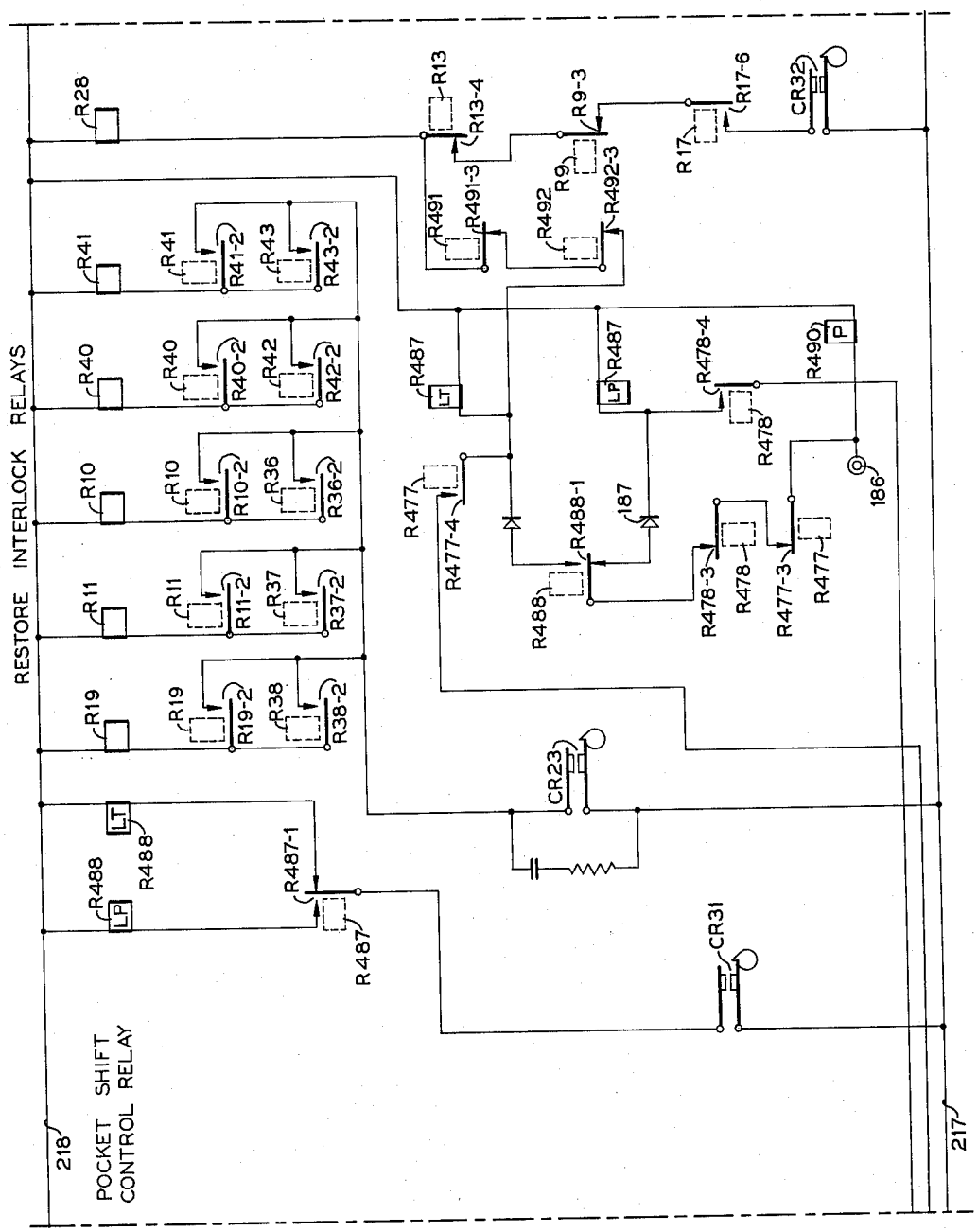
Figure 6K:
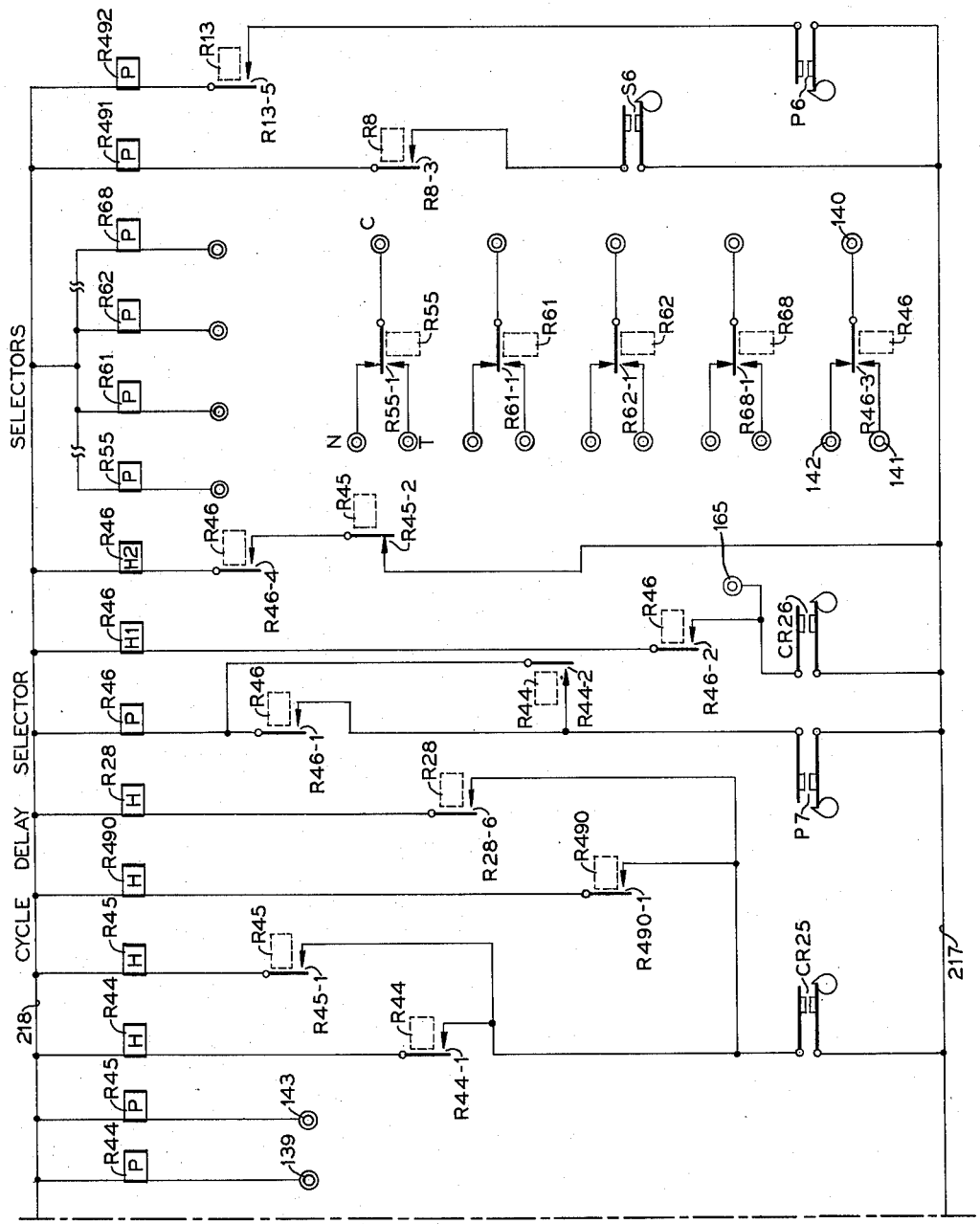

As is shown in FIG. 6k, relay R492 is de-energized after relay R13 is dropped out when cam contacts P6 separate. Hence, relay contacts R492-1 (FIG. 6h) close, and voltage is applied to runout hub 182 every machine cycle during the time interval from 238° to 259°.

Similarly, when the last secondary card SC is moved out of secondary hopper SH (FIG. 1) to a position just ahead of the secondary reading station, start relay R17 will drop out when the circuit thereto is opened by the shifting of the hopper relay R2 contacts, whereupon the machine will stop. During the next secondary feed cycle, the last secondary card will be moved through the secondary reading station whereat the data in the cards are read. During the next and last secondary feed cycle, a card SC will be fed into one of the stacker pockets, and relay R5 will be de-energized when secondary card lever contact fails to make. Furthermore, relays R8, R9 and R491 will be de-energized when cam contact S6 opens. The drop-out of relay R5 forms a circuit through which the energization of hopper relay R4 causes contacts R4-2 (FIG. 6a) to make, whereby the secondary automatic hot 9 impulse circuit is formed through cam contacts S1 and relay contacts R4-2. It is to be observed that although contacts R4-2 make during the feed cycle preceding the last feed cycle, an automatic hot 9 impulse is not read into secondary read-in unit 121 because the reading brushes SB are insulated from the contact roll SCR by the last card SC at 9-time. Referring to FIG. 6h, a voltage is applied to runout hub 182 every machine cycle when contacts R491-1 make.

As is shown in FIG. 8, the runout hub 182 is connected by plug wire to the C hubs of selectors Nos. 12 and 13. The T hubs of the said selectors are connected by plug wire to pocket shift hub 186 and to the cycle delay selector drop-out hub 143. In view of the fact that selector No. 12 is picked as a result of secondary sequence step-down condition, and selector No. 13 is picked as a result of a primary sequence step-down condition, during the runout portion of machine operation when either or both of the relays R491 (FIG. 6k) and R492 are de-energized so that their respective contacts R491-1 (FIG. 6h) and R492-1 are closed, a pocket shift will occur for every sequence step-down condition in either feed unit.

*Pocket shift circuit No. 1.*—From the +40 volt line 217 (FIG. 6h) through contacts CR3, R17-3, CR4, and R492-1 or R491-1, the plug wire connecting the runout hub 182 and the C hubs of selectors Nos. 12 and 13, selector No. 12 contacts R66-1 n/o or selector No. 13 contacts R67-1 n/o, the plug wire connecting the aforesaid selector T hubs and pocket shift hub 186 (FIG. 6j), contacts R477-3, R478-3, relay coil R487LP via contacts 488-1 n/c, or coil R487LT via contacts 488-1 n/o, to the other side of the line.

As the description advances, it will become clear that when relay coil R487LP is energized the pocket select mechanism is shifted under control of magnet 67 (see FIG. 6h) so that cards PC and SC then feed into pocket SP2, whereas when coil R487LT is energized the cards are ejected into pocket SP1.

At the start of a new machine operation, it is necessary that the pocket select mechanism be latched in a position whereby the cards are first fed into pocket SP1. This condition is brought about when all of the cards have been run out of both feeds during a previous machine operation by the formation of a reset circuit from the +40 volt line 217 (FIG. 6j), cam contacts CR32, relay contacts R17-6, secondary card lever hold relay contacts R9-3, primary card lever contact hold relay contacts R13-4, R491-3, and R492-3, relay coil R487LT, to the other side of the line.

As is shown in FIG. 6j, a parallel circuit is effective to energize relay R28 whose contacts R28-1 to R28-5, inclusive, close to energize relays R36 (FIG. 6i), R37, R38, R42 and R43 in order to clear out the units 120 to 124, inclusive.

SIGNAL CARD CIRCUITS

Quite often during a machine operation, cards are run out of either feed considerably before the cards in the other feed are run out. Also, quite often one of the two stacker pockets SP1 and SP2 may be filled up with cards before all the cards in the hoppers PH and SH have been run out. In either case, it would be desirable to place the cards which are stacked in pocket SP2 in the secondary hopper SH and those which are stacked in pocket SP1 in the primary hopper PH, before running out all of the cards originally placed in these hoppers.

The foregoing may be accomplished by the use of so-called signal cards each of which is of a distinctive color, easily recognizable when interspersed with the cards being run through the collator. Primary signal card has an X control hole punched in the column wired to an X selector pick-up relay, column 80 for example, and the secondary signal card has an X-hole punched in the column wired to a secondary X selector pick-up coil. As is shown in FIG. 8, the primary signal card X-hole in column 80 read by a corresponding primary brush PB is connected by plug wire to the primary X selector hub, and the secondary brush SB for column 80 is connected by a plug wire to the secondary X selector hub.

*Primary X selector pick circuit.*—From the +40 volt line 217 (FIG. 6a), contacts CR13, CB1 or CB2 and CB3 or CB4, R6-3 n/o, the column 80 primary reading brush PB via contact roll PCR, the plug wire (FIG. 8) connecting the column 80 and PRI.X hubs (see also FIG. 6d), cam contacts P3, to the control grid of vacuum tube V6. As the screen grid and plate are each connected to the +115 volt line 229, the aforesaid X-time impulse via the primary reading station renders vacuum tube V6 conducting to thereupon render selector relay R477 picked.

*Secondary X selector pick circuit.*—From the +40 volt line 217 (FIG. 6a) through contacts CR13, CB1 or CB2 and CB3 or CB4, R5-3, the column 80 secondary reading brush SB via secondary contact roll SCR, the plug wire (FIG. 8) connecting column 80 and SEC.X hub (see also FIG. 6d), cam contacts S5, to the control grid of vacuum tube V7 so as to energize tube X7 to thereupon cause secondary X selector relay R478 to pick.

The picking of secondary X selector relay R478 causes relay coil R487LP (FIG. 6j) to become energized via contacts R478-4 so as to set the pocket select mechanism in a position whereby the cards may be ejected onto stacker pocket SP2. On the other hand, the pick-up of primary X selector relay R477 causes relay coil R487LT to become energized via contacts R477-4 during a subsequent primary feed cycle, whereby the pocket select mechanism is set to direct the cards being ejected to pocket SP1.

In addition to the X control perforations in the signal cards, the primary signal card has assigned thereto an R-3-8 control value, whereas the secondary signal card has a blank control value.

At the start of a machine operation run, each signal card is placed in its respective hopper ahead of the other cards in the hopper. Since the secondary signal card has a blank control value field it will be ejected prior to the primary signal card, and due to the X control punch in the secondary card, it will be directed to pocket SP2. The primary signal card will feed immediately thereafter, and due to the X control punch therein is directed to pocket SP1. Thereafter, as the machine operation progresses, the secondary X card will always be directed to pocket SP2, whereas the primary X card will be directed to pocket SP1.

OPERATION AND REMAINING CIRCUITS

As mentioned previously, the embodiment described herein is capable of sorting two separate sets of cards which may be arranged in any order as to the control data thereof, into one set wherein the merged cards are finally arranged in a sorted sequence according to the control data thereof so that the control data on each card are either equal to or greater than the control data on the next preceding card. As the description advances, it will become clear that more than one card run or operation through the machine may be necessary in order to sort all of the cards into one set.

In order to accomplish the sorting-by-collation operation to be described in detail shortly in connection with FIGS. 9a-9j, the present machine is plugboard wired in the manner shown in FIG. 8 so as to operate according to the following rules:

*Primary feed rules.*—A primary feed cycle whereby primary cards PC are advanced will occur as a result of any of the following conditions:

(1) A low primary cross-feed condition which is accompanied by a sequence step-up condition in each of the primary and secondary feeds.

(2) A low primary cross-feed condition which is accompanied by a sequence step-down condition in both the primary feed and the secondary feed.

(3) An equal, or matched, cross-feed condition.

(4) A low secondary cross-feed condition which is accompanied by a secondary sequence stepdown and a primary sequence step-up.

(5) A low secondary cross-feed condition which is accompanied by a primary sequence step-down and a secondary sequence step-up.

*Secondary feed rules.*—A secondary feed cycle whereby secondary cards SC are advanced will occur as a result of any of the following conditions:

(1) A low secondary cross-feed condition which is accompanied by a sequence step-up condition in both the primary feed and the secondary feed.

(2) A low secondary cross-feed condition which is accompanied by a sequence step-down in both said feeds.

(3) An equal, or matched, cross-feed condition.

(4) A low primary cross-feed condition which is accompanied by a primary sequence step-down and a secondary sequence step-up.

(5) A low primary cross-feed condition with a secondary sequence step-down and a primary sequence step-up.

A careful study of the foregoing rules will reveal that a primary card feed operation will occur consequent upon, (a) a low primary cross-feed condition accompanied by similar sequence conditions, (b) a low secondary cross-feed condition accompanied by different sequence conditions, and (c) an equal cross-feed condition without regard to the condition of the sequences. On the other hand, a secondary card feed operation will occur as a result of, (a) a low secondary cross-feed condition accompanied by similar sequence conditions, (b) a low primary cross-feed condition accompanied by sequences that are different, and (c) an equal cross-feed condition without regard to the condition of the sequence readings.

Figure 9A:
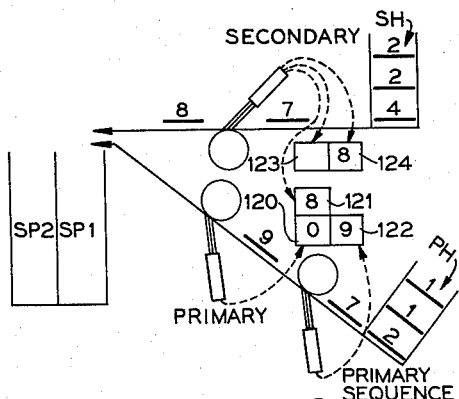

Referring to FIG. 9a, a sorting-by-collation operation will now be described, as mentioned previously, in which the secondary cards SC and the primary cards PC are initially arranged in their respective feed hoppers according to the control data values 8, 7, 4, 2, and 2 as to the secondary cards, and the control data values 9, 7, 2, 1 and 1 as to the primary cards. Furthermore, column 1 of the primary card has the afore-mentioned primary control data values perforated therein as does column 1 of the secondary card. Thus, column 1 of the primary card will be read by the reading brush associated with hub 96 (see FIGS. 1, 6a and 8), whereas column 1 of the secondary card will be read by the reading brush associated with hub 100. In addition thereto, column 1 of the primary cards will also be read at the sequence reading station by the reading brush associated with hub 130. It should be clear that a one card column control data value has been selected in order to avoid undue prolixity and unnecessary complexity, and that any number of columns of control data might be used to control the machine sorting operation.

*First primary and secondary feed cycles*

As has been described previously in Run-in circuit description, in order to start a machine operation the start key (FIG. 6c) is depressed so that relay R17 is energized thereby. Contacts R17-3 (FIG. 6h) then close, and the circuits of secondary, primary and eject magnets 62, 63 and 65, respectively, are then established. Thereupon, primary and secondary card feed cycles ensue during which the first cards in each of the two feed units are advanced from their respective hoppers PH (FIG. 1) and SH to positions behind the sequence and secondary card reading stations QB and SB, respectively. In view of the fact that each set of plugboard hubs 131—132 (see also FIG. 8), 133—134, and 135—136 is connected by plug wires as shown, the code relay data clearing relays R36 (FIG. 6i) and R37 are energized during the first primary feed cycle via cam contacts P5, whereas code relay data clearing relays R38 and R42 are energized during the first secondary feed cycle via cam contacts S4 (as will be explained shortly, relay R485 is not picked at this time). This causes the code relay hold circuits associated with cam contacts CR18 (FIG. 6d), CR17, CR16 and CR14 to open when said cam contacts separate at 300° (see also FIG. 7), so that the data which was stored in the said code relays is cleared out. In addition to the foregoing, restore interlock relays R10 (FIG. 6j), R11, R19, and R40 are also caused to pick via the contacts of the afore-mentioned clearing relays and cam contacts CR23, and are maintained picked through their respective stick points and the cam contacts CR23 during the data reading portion of the next following card feed cycles (see also FIG. 7).

*Second primary and secondary feed cycles*

In response to the start key (FIG. 6c) being held down, relay R17 is maintained energized. As a result, second primary and secondary feed cycles are effected simultaneously during which the first card in each feed unit is fed through its respective sequence and secondary data reading stations QB (see also FIG. 1) and SB. At the same time the next following, or second, cards in each feed unit are advanced from their respective hoppers to take up the positions just vacated by the first cards. Relays R5 (FIG. 6c), R7, R8, R9, R14 and R15 are energized during the second cycle in the manner described previously. As a result, contacts R7-3 (FIG. 6a) shift to thereby enable the first primary card PC having a 9-hole therein (see also FIG. 9a) to be read as it is fed through the sequence station, and contacts R5-3 close whereby the first secondary card SC is also read as it traverses the secondary station.

It will be assumed for the purpose of this description that relay R485 (FIG. 6i) is not in a picked condition prior to the operation of the start key for the first time. It should be made clear, however, that it would not make any difference in the sorting-by-collation operation were said relay in a picked condition prior to the first machine cycle. Hence, during the first secondary feed cycle, relay coil R485LP will be energized through cam contacts S3 and relay contacts R486-2 n/c. The fact that relay R485 is picked during the first said cycle causes contacts R485-1 (FIG. 6h) to close, whereby relay coil R486P is caused to be energized via the secondary feed magnet circuit No. 1 along with secondary feed clutch magnet 62 during the tail end of the first cycle and prior to initiation of the second secondary feed cycle. As is shown in FIG. 6i, coil R846H is energized through contacts CR24 and R486-1. Hence, during the second secondary cycle at a time said coil R486H is maintained energized, coil R485LT will be energized through contacts S3 and R486-2 n/o. Thus, it will be observed, relay coils R485LP and R485LT are alternately energized during alternate secondary card feed cycles under the control of the contacts R486-2, whereby relay R485 is picked up during one secondary cycle and dropped out during the next secondary cycle. As the description advances, it will become clear that relay R485 is actually a secondary data "tumbling" control means for governing secondary sequence readings. That is, the operation of contacts R485-3 determines whether the secondary data is to be entered into the first or the second secondary sequence units 123 (see also FIG. 9a) and 124, respectively, whereas the operation of contacts R485-1 (FIG. 6g) determines the sequential arrangement of the data in said units.

Inasmuch as relay coil R485LP (FIG. 6i) is energized during the first secondary feed cycle after the first secondary sequence relay R42 was energized, the second secondary sequence clearing relay R43 will be energized during the second secondary feed cycle through contacts S4 and R485–3 n/o. The closing of contacts R43–2 (FIG. 6j) causes restore interlock relay R41 to pick when cam contacts CR23 close, whereas the separation of contacts R43–1 (FIG. 6d) causes the code relay hold coils associated therewith and with cam contacts CR15 to de-energize so as to clear out unit 124. De-energization of the restore interlock relay R41 causes relay contacts R41–1 (FIG. 6b) to transfer, to thereby condition vacuum tube V4 for conduction during the second secondary card feed cycle. In summation then, during the second primary feed cycle, clearing relays R37 (FIG. 6i) and R36 are energized and during the second secondary feed cycle, clearing relays R38 and R43 are energized through circuits described previously.

As is shown in FIG. 8, secondary reading station hub 100 (see also FIGS. 1 and 6a) is connected by plug wires 173, 177 and 178 to secondary read-in hub 99 (see also FIG. 6b), first secondary sequence read-in hub 174, and second secondary sequence read-in hub 175. Primary reading station hub 96 is connected by plug wire to primary read-in hub 95, and primary sequence reading station hub 130 is connected by plug wire to primary sequence read-in hub 176. Inasmuch as clearing relays R38 (FIG. 6i), R43, R37 and R36 are energized during the simultaneous second primary and secondary feed cycles, restore interlock relay contacts R19–1 (FIG. 6b), R41–1, R11–1 and R10–1 will be transferred so as to make contact on the normally open side. Accordingly, since the first secondary card has an 8-hole therein (see FIG. 9a) in column 1, and the first primary card has a 9-hole therein in column 1, the following data read-in circuits are effective during the aforementioned simultaneous second card feed cycles:

*Secondary card data read-in.*—Code relay R114 (FIG. 6b) is picked through coding relay contacts R469–5 when tube V5 is rendered conducting at 8-time from the +40 volt line 217 (FIG. 6a), through contacts CR13, CB1 or CB2 and CB3 or CB4, and R5–3, secondary contact roll SCR, the plug wire (see also FIG. 8) connecting hubs 100 and 99 (FIG. 6b), to control grid 91 of tube V5. Relay coil R114H (not shown) is energized through cam contacts CR16 (FIG. 6d) and maintained energized via relay contacts R38–1 as described hereinbefore. Thus, a numeral 8 is stored in the secondary comparing position 121 by the operation of code relay R114.

*Second secondary sequence card data read-in.*—Code relay coil R385P (FIG. 6b) is energized via contacts R469–4 when vacuum tube V4 is energized at 8-time, from the +40 volt line 217 (FIG. 6a), contacts CR13, CB1 or CB2 and CB3 or CB4, and R5–3, secondary contact roll SCR, plug wires 173 (see also FIG. 8), 174 and 175 connecting hubs 100 and 174 (FIG. 6b) to control grid 91 of vacuum V4. Relay coil R385H (not shown) is energized through contacts CR15 (see FIG. 6d) and R43–1 to store a numeral 8 in comparing position 124.

*Primary sequence card data read-in.*—Code relay R118 (FIG. 6b) is picked through coding relay contacts R473–2 when vacuum tube V2 is energized at 9-time from the +40 volt line 217 (FIG. 6a), contacts CR13, CB1 or CB2 and CB3 or CB4, and R7–3 n/o, primary sequence contact roll QCR, the plug wire (see also FIG. 8) connecting hubs 130 and 176 (FIG. 6b), to control grid 91 of vacuum tube V2. Relay R118H (FIG. 6d) is energized through cam contact CR18 (FIG. 6d) and maintained energized via relay contacts R36–1 as described previously to represent the storage of a numeral 9 in the primary sequence comparing position 122 (FIG. 6b).

As mentioned hereinbefore, contacts R6–3 (FIG. 6a) are in normal status prior to the third primary card feed cycle. Consequently, the primary station sensing circuit cannot form prior to this cycle. Accordingly, there is present at the primary station the equivalent of a blank card because contacts R2–3 are separated, and relay R2 (FIG. 6c) is dropped out so long as there are cards in primary hopper PH. Although hubs 100 (FIGS. 6a and 6b) and 174 are connected by plug wires 173 (see also FIG. 8) and 177, the first secondary sequence vacuum tube V3 is not energized when the first secondary card SC traverses the secondary reading station because restore interlock relay contacts R40–1 are not transferred during the said feed cycle. Referring to FIGS 6i and 6j, the restore interlock relay R40 is energized during alternate secondary feed cycles when relay R42 is picked under control of contacts R485–3. It should be pointed out here that since relay R42 was picked during the first secondary feed cycle, any data that might have been stored in the first secondary sequence unit as represented by energized code relays from a previous machine operation, has been cleared out.

Thus, at the completion of the simultaneous second primary-secondary feed cycles, first secondary sequence unit 123 (see FIG. 9a) has a blank value stored therein; the second secondary sequence unit 124 has an 8-value stored therein; the secondary unit 121 also has an 8-value stored therein; the primary unit 120 has a blank value stored therein; and the primary sequence unit 122 has a 9-value stored therein.

*Third primary feed cycle*

The third primary feed cycle will take place in any event after the simultaneous second card feed cycles so long as the start key is held down to maintain start relay R17 picked. Thereafter, however, the start relay will be retained in energized status so that the start key may be released. As described previously, there is no circuit path which may be closed at this time to the secondary clutch magnet 62 (FIG. 6h); a circuit is completed to energize only the primary clutch magnet. During the third primary card feed cycle, the first primary card having a 9-hole therein (see FIG. 9b) is moved through the primary reading station (see also FIG. 1) and, at the same time, the second primary card having a 7-hole therein traverses the sequence reading station. Before the said primary record cards are read, however, relay R6 (FIG. 6c) is picked, and is then followed by the operation of relays R12 and R13 in the manner described hereinbefore. Contacts R6–3 (FIG. 1) shift as a result, to thereby enable the 9-hole data in the first primary card to be read as it is moved through said primary reading station. Accordingly, the following primary data read-in circuit is formed at 9-time:

*Primary card data read-in.*—From the +40 volt line 217 (FIG. 6a), contacts CR13, CB1 or CB2 and CB3 or CB4, and R6–3 n/o, primary contact roll PCR, the plug wire (see also FIG. 8) connecting hubs 96 and 95 (FIG. 6b), to control grid 91 of vacuum tube V1.

Code relay R116 is then picked through coding relay contacts R473–1 (FIG. 6b), and coil R116H is energized through parallel connected cam contacts CR17 and relay contacts R37–1. Through formed primary sequence data read-in circuits similar to those described previously, primary sequence code relay R112 (FIG. 6b) is picked at 7-time when the second primary card having a 7-hole punched therein (see also FIG. 9b) is moved through the sequence reading station. Consequently, at the end of the third primary feed cycle, an 8-value will be stored in secondary unit 121 (FIG. 9b) as represented by energized secondary code relay R114 (see also FIG. 6b), an 8-value will be stored by energized second secondary sequence code relay R385 in unit 124, a 9-value will be stored by energized code relay R116 in primary unit 120, and a 7-value will be stored by energized primary sequence code relay R112 in unit 122. As a result of the energization of the afore-mentioned code relays, the following correction relay pick circuits (FIGS. 6e and 6f) will be formed:

*Relay R390P.*—From the +40 volt line 217 through contacts CR20, R17–6, R109–2 and R112–2 n/o, relay R390P, to the other side of the line.

*Relay R392H.*—The +40 volt line 217, contacts CR20, R17–6, R107–3, R110–3 n/c, and R116–3 n/o, relay R392H via wire 103, to the other side of the line.

*Relay R391P.*—From the +40 volt line 217 through contacts CR20, R17–6, R108–3 n/c via wire 101, R117–3 n/c, and R114–3 n/o, relay R391P via wire 102, to the other side of the line.

*Relay R389H.*—From the +40 volt line 217 through contacts CR20, R17–6, R107–3, R110–3 n/c, and R116–3 n/o, relay R389H via wire 103, to the other side of the line.

*Relay R450P.*—From the +40 volt line 217 through contacts CR20, R17–6, R387–2 via line 101, R384–2, R381–2, R378–2, R375–2, and R372–2, relay R450P, to the other side of the line. A parallel circuit to relay R450P will be completed from the +40 volt line 217 through cam contacts CR20, relay contacts R17–6, R379–3 via wire 101, R388–3 n/c, and R385–3 n/o, relay R405P, to the other side of the line.

When cam contacts CR21 (FIG. 6g) close at 210° (see also FIG. 7) after the correction and code relays have been energized, the following feed control comparison test circuits are formed:

*High secondary sequence.*—From the +115 volt line 229 (FIG. 6g) through contacts CR21, R17–5, R449–1 n/c, and R450–2 n/o, to the normally open contact strap of contacts R485–1 via wire 170. It will be recalled that relay coil R485LT (FIG. 6i) was energized during the second secondary feed cycle so as to drop out relay R485. Hence, the contacts R485–1 (FIG. 6g) are not transferred at this time, and accordingly low secondary sequence feed control relay R479 will not be picked at this time.

It should be clear by now that relay R485 through its contacts R485–1 governs the sequence comparison of secondary cards passing through the secondary feed unit which includes only one reading station. Referring to FIG. 6i, relay R485 is alternately picked up and dropped out via the contacts R486–2 during alternate secondary card feed cycles. As a result, first and second secondary sequence clearing relays R42 and R43, respectively, are picked separately during alternate secondary card feed cycles, to thereby cause secondary card data to be entered for storage alternately into the first and the second secondary sequence units 123 (FIG. 6b) and 124, respectively. Inasmuch as one arrangement of secondary sequence code relay contacts in the secondary sequence compare circuits (see FIG. 6g) is provided to afford a secondary sequence data compare means, it is necessary to alter the relationship of the circuits during at least each secondary card feed cycle so that the last record card analyzed by the secondary sensing station (see also FIG. 1) always stands in a dominant position to the preceding secondary card. For the purpose of this description, a record card will be termed as standing in a dominant position to a next preceding card and in a subordinate position to a next following card. Thus, a signal impulse along line 171 (FIG. 6g) during the cycle that relay R485 is deenergized, is indicative of the low secondary sequence reading, and a signal impulse along line 170 during a cycle in which relay R485 is energized, is also indicative of a low secondary sequence reading.

*Low secondary.*—From the +115 volt line 229 (FIG. 6g) through cam contacts CR21, relay contacts R17–5, R391–1 n/o, R392–1 n/o, R101–5 n/c, R102–6 n/c, R104–5 n/c (not shown), R105–6 n/c, R107–5 n/c, R108–6 n/c, R110–5 n/c, R111–6 n/c, R113–5 n/c, and R114–6 n/o, to starting anode 103 of gas tube G4 via wire 104 and resistor 105. As cam contacts CR22 are closed from 215° (see also FIG. 7) to 260°, a low secondary feed control relay R484 will be energized.

*Low primary sequence.*—From the +115 volt line 229 through contacts CR21, R17–5, R390–1 n/o, R389–1 n/o, R101–6 n/c, R103–6 n/c, R104–6 n/c (not shown), R106–6 n/c, R107–6 n/c, R109–6 n/c, R110–6 n/c, and R112–6 n/o, to starting anode 103 of tube G6 via wire 172 and resistor 179. Hence, low primary sequence feed control relay R481 will be picked through cam contacts CR22.

As a result of the foregoing, during the third primary cycle low primary sequence relay contacts R481–2 (FIG. 6h) and low secondary contacts R484–2 will close to apply a voltage to their respective low primary sequence hubs 137 (see also FIG. 8) and low secondary hubs 138, when cam contacts CR3 close at 230° (see also FIG. 7). As is shown in FIG. 8, a low primary sequence hub 137 is connected by plug wire to the primary cycle delay selector pick-up hub 139, whereby the following circuit is completed during the third primary feed cycle:

*Primary cycle delay selector R44P circuit.*—From the +40 volt line 217 (FIG. 6h) through contacts CR3, R17–3 and R481–2, the plug wire (see also FIG. 8) connecting hubs 137 and 139 (FIG. 6k), relay coil R44P, to the other side of the line. Contacts R44–1 will close so as to energize coil R44H through cam contacts CR25 timed to open at 355° (see also FIG. 7).

Consequently, relay contacts R44–2 in the circuit of coil R46P will remain engaged until 355°. As to be explained in detail shortly, if the card feed cycle immediately following the one during which relay coil R44P is energized is not a primary card feed cycle, cycle delay transfer relay R46P (FIG. 6k) will not be energized. This is for the reason that cam contacts P7 in the relay coil R46P circuit make at 320° (see also FIG. 7) of a primary feed cycle only. The one-revolution primary feed clutch 36 (see also FIG. 2) is latched at approximately 266°, however. Thus, if the said next following feed cycle is not a primary feed cycle, cam contacts P7 will remain separated at 320°, as they were at 266°. On the other hand, if the card feed cycle immediately following the one during which relay coil R44P is energized is a primary feed cycle, relay coil R46P will be energized at 320° through said cam contacts P7 and relay contacts R44–2. Once picked, relay coil R46P will remain energized through cam contacts P7 and its own stick points R46–1 until 162° of the aforesaid next primary feed cycle. In addition, relay coil R46H1 will be energized from 169° to 260° via the +40 volt line 217 through contacts CR26 and R46–2, and relay coil R46H2 will be energized through contacts R45–2 and R46–4. When the foregoing action does occur, relay contacts R46–3 transfer so that a circuit is completed from the cycle delay selector common hub 140 (see also FIG. 8) to transfer hub 141. It is important to remember that these cycle delay contacts will shift only if a primary feed cycle follows immediately after the primary feed cycle during which relay coil R44P (FIG. 6k) is energized. The cycle delay contacts R46–3 may remain transferred any number of feed cycles so long as relay coil R46H2 remains energized, of course. Coil R46H2 is de-energized when an impulse to the cycle delay selector drop-out hub 143 (see also FIG. 8) causes relay coil R45P to pick, whereupon contacts R45–2 in the coil R46H2 circuit, separate. However, when relay R46 is once picked, it will remain picked, as will contacts R46–3 remain transferred, until approximately 260° of the same card feed cycle due to the relay coil R46H1 circuit. Since relay coil R45H is energized through cam contacts CR25 and relay contacts R45–1 until approximately 355°, relay R46 will be caused to drop out at 260° when coil R46H1 is de-energized.

*Relay selectors.*—There are 14 relay selectors Nos. 1–14 each of which is associated with a respective relay R55 to R68, inclusive, in addition to the afore-described cycle delay selector relay R46. As is shown in FIG. 6k, each of these selectors (only four are shown) includes a set of transfer contacts R55–1 through R68–1 which are engaged on the normally open side to form a circuit through the common C (see also FIG. 8) and transfer T hubs when a relay is energized. The contacts are made on the normally closed side to form a circuit through the common C and the normal N hubs when a relay is deenergized. After the feed control comparison tests of the third primary cycle, none of the selectors are operated.

Third secondary feed cycle

Inasmuch as a high secondary sequence, low secondary, low primary sequence condition without a primary feed cycle exists after the third primary feed cycle so as to result in secondary step-up, low secondary and primary step-up conditions, respectively, the first secondary card SC having an 8-hole punched therein will be advanced to pocket SP1 (see also FIG. 1) during the third secondary feed cycle as a result of the energization of the secondary clutch magnet 62 (FIG. 6h). This is in accordance with the aforestated secondary feed rule No. 1 which states that a secondary feed cycle will occur as a result of a low secondary cross-feed condition with similar sequence conditions. It is to be observed that a primary step-up condition exists at this time because there has not been a low primary sequence condition which was immediately followed by a primary card feed operation.

*Secondary feed circuit No. 2.*—From the +40 volt line 217 (FIG. 6h) through contacts CR3, R17–3, CR4, a plug wire connecting a hub 152 (see also FIG. 8) and No. 2 selector hub C, No. 2 selector contacts R56–1 n/c (not shown), a plug wire connecting No. 2 selector hub N and No. 3 selector hub C, No. 3 selector contacts R57–1 n/c (not shown), a plug wire connecting No. 3 selector hub N and No. 4 selector hub N, No. 4 selector contacts R58–1 n/c (not shown), the plug wire connecting No. 4 selector hub C and No. 5 selector hub C, No. 5 selector contacts R59–1 n/c (not shown), the plug wire connecting No. 5 selector hub C and secondary feed hub 153 (see also FIG. 6h), contacts R9–2 n/o, and secondary feed clutch magnet 62, to the other side of the line.

For reasons that a circuit was not completed to hub 186 (see FIGS. 6j and 8), relay coil R487LP (FIG. 6j) was not energized during the third primary feed cycle. Thus, a circuit to energize pocket select magnet 67 (FIGS. 1, 3 and 6h) cannot form via the normally open contacts R487–2. Inasmuch as reset solenoid 68 (FIGS. 3 and 6h) is energized each machine cycle through cam contacts CR27, and due to the fact that pocket select magnet 67 (FIG. 3) has not been energized, lever 53 is caused to latch onto armature 79 at latch slot 80. As a result of the foregoing, the first secondary card having an 8-hole punched therein is ejected into pocket SP1 (FIG. 1) during the third secondary feed cycle (see also FIG. 9c).

During this latter card feed cycle, i.e., the third secondary feed cycle, first secondary sequence clearing relay R42 (FIG. 6i) is energized through contacts S4 and R485–3 n/c, and relay coil R485LP is energized thereafter via contacts S3 and R486–2 n/c. It is to be observed that the timing of the impulse through cam contacts S4 (see also FIG. 7) is prior to the timing of cam contacts S3 so that the clearing relay R42 will be picked immediately before the time relay contacts R485–3 shift. In addition thereto, secondary clearing relay R38 is energized through cam contacts S4 and the plug wire connecting hubs 131 and 132. As described hereinbefore, the code relay hold circuits associated with the energized clearing relays (see FIG. 6d) open at 300° when the cam contacts, such as CR14 for example, associated with the said relays separate. Furthermore, the vacuum tubes in the data read-in circuits (FIG. 6b) associated with the restore interlock relays energized under control of the said energized clearing relays, are conditioned for conduction. Thus, during the data reading portion of the third secondary card feed cycle, code relay R111 (FIG. 6b) will be energized through the aforedescribed secondary read-in circuit when the second secondary card having a 7-hole punched therein traverses the secondary reading station SB (see also FIG. 1). In addition, code relay R381 will be energized through the following first secondary sequence read-in circuit:

*First secondary sequence read-in.*—From the +40 volt line 217 (FIG. 6a) through contacts CR13, CB1 or CB2 and CB3 or CB4, R5–3, secondary contact roll SCR, the plug wires (see also FIG. 8) connecting hubs 100 and 174 (FIG. 6b), to the control grid 91 of vacuum tube V3. Relay coil R381 will then be energized through coding relay contacts R465–3 when vacuum tube V3 is energized in response to the 7-hole in the second secondary card. Relay coil R382H (not shown) is energized through cam contacts CR14 (FIG. 6d) and relay contacts R42–1 in the manner described previously.

In view of the fact that there is not a primary feed cycle taking place at this time, i.e., at the time of the third secondary feed cycle, the primary and the primary sequence code relays which were energized during the prior third primary feed cycle, will remain energized during the third secondary feed cycle. Similarly, the second secondary sequence code relays which were energized during the second secondary feed cycle, will remain energized. However, the energization of relay coil R485LP (FIG. 6i) during the third secondary cycle and the resulting shift of contacts R485–1 (FIG. 6g) will alter the relationship of the 8-value data stored in the second secondary unit 124 from a dominant position to a subordinate position. This is shown diagrammatically in FIG. 9c wherein the first secondary sequence unit 123 has a 7-value stored therein; second secondary sequence unit 124 has an 8-value stored therein; secondary unit 121 has a 7-value stored therein; primary unit 120 has a 9-value stored therein; and primary sequence unit 122 has a 7-value stored therein. As a result of the foregoing, at 206° of the third secondary feed cycle, correction relays R389 (FIGS. 6e and 6f), R391, R449 and R450 will be energized via the following circuits:

*Relay R389H and R392H circuits.*—From the +40 volt line 217 (FIG. 6e) through contacts CR20, R17–6, R107–3, R110–3 n/c, and R116–3 n/o, relay coil R389H, to the other side of the line. A parallel circuit is effective to energize coil R392H via wire 131.

*Relay 390P circuit.*—From the +40 volt line 217 through contacts CR20, R17–6, R109–2, R112–2 n/o, relay coil R390P, to the other side of the line.

*Relay 391 circuit.*—From the +40 volt line 217 through contacts CR20, relay contacts R17–6, R108–2 via wire 101, R111–2 n/o, relay coil R391P via wires 132 and 102, to the other side of the line.

*Relay R449 circuit.*—From the +40 volt line 217 through contacts CR20, R17–6, R378–5 n/c (FIG. 6f), via wire 101, R387–4 n/c, and R384–4 n/o, relay coil R449H, to the other side of the line.

*Relay R450 circuit.*—From the +40 volt line 217 through contacts CR20, R17–6, R379–2 (FIG. 6f) via wire 101, and R382–2 n/o, coil R450P via wire 133, to the other side of the line.

Referring to FIG. 6g, inasmuch as all of the correction relays are picked and since the code relays R111, R112, R116, R381, and R385 are also picked, a low secondary condition, a low primary sequence condition, and a low primary sequence condition will exist. Hence, low secondary sequence feed control relay R479, low secondary feed control relay R484 and low primary sequence feed control relay R481, will be energized through the following circuits when cam contacts CR21 close at approximately 210° (see also FIG. 7):

*Low secondary sequence condition.*—From the +115 volt line 229 (FIG. 6g) through contacts CR21, R17–5, R449–1 n/o, R450–1 n/o, R373–5 n/c, R372–6 n/c, R376–5 n/c (not shown), R375–5 n/c, R379–5 n/c, R378–6 n/c, R382–5 n/c, R381–5 n/o, R485–1 n/o via wire 170, to the starter anode of gas tube G1. As a result, said gas tube G1 will be rendered conducting, and relay R479 will be energized via cam contacts CR22.

*Low secondary condition.*—From the +115 volt line 229 through contacts CR21, R17–5, R391–1 n/o, R392–1 n/o, R101–5 n/c, R102–6 n/c, R104–5 n/c (not shown), R105–6 n/c, R107–5 n/c, R108–6 n/c, R110–5 n/c, R111–6 n/o, to starter anode 103 of gas tube G4 via wire 104 and resistor 105. This will cause gas tube G4 to conduct, whereupon relay R484 will become energized via cam contacts CR22.

*Low primary sequence condition.*—From the +115 volt line 229 through contacts CR21, R17–5, R390–1 n/o, R389–1 n/o, R101–6 n/c, R103–6 n/c, R104–6 n/c (not shown), R106–6 n/c, R107–6 n/c, R109–6 n/c, R110–6 n/c, and R112–6 n/c, to the starter anode of gas tube G6 via wire 172 and resistor 179 so as to render said gas tube conducting, and relay R481 energized via cam contacts CR22.

Hence, in view of the fact that as a result of the third secondary feed cycle, there appears a low secondary sequence condition (a secondary step-down), a low secondary cross-feed condition, and a low primary sequence condition without a following primary feed cycle (a primary step-up), a fourth primary feed cycle will be effected in accordance with the aforestated primary feed rule No. 4; i.e., a primary feed cycle will occur as a result of a low secondary cross-feed condition which is accompanied by a sequence step-down in both feed units. It will be recalled that a primary step-up may occur when there is a low primary sequence condition if the said condition is not immediately followed by a primary feed cycle. Hence, since the low primary sequence condition detected during the third primary feed cycle was actually followed by the third secondary feed cycle just described, and not by another primary feed cycle, at the end of the third secondary feed cycle the low primary sequence condition is analyzed to be a primary step-up.

The afore-mentioned conditions cause the operation of selectors Nos. 3 (FIG. 8), 7, 9, and 12, i.e., due to low secondary sequence. Furthermore, a cycle delay selector pick-up impulse is directed to hub 139.

*Fourth primary feed cycle*

In accordance with aforestated primary feed rule No. 4, a fourth primary feed cycle will take place. During the third secondary feed cycle, cam contacts CR3 (FIG. 6h) close at 230° (see also FIG. 7), to thereby apply a voltage to low secondary sequence hubs 146 (see also FIG. 8) via contacts R479–2 (low secondary sequence relay coil R479 as shown in FIG. 6g) and low primary sequence hubs 137 via contacts R481–2. Referring to FIG. 8, as a result of a voltage appearing at said hub 146, the selectors Nos. 3, 7, 9, and 12 are picked to cause the following circuit to the primary feed clutch magnet 63 to form:

*Primary feed circuit No. 2.*—From the +40 volt line 217 (FIG. 6h), through contacts CR3, R17–3, CR4, the plug wire connecting a hub 152 (see also FIG. 8) and No. 1 selector hub C, selector No. 1 contacts R55–1 n/c, the plug wire connecting No. 1 selector hub N and No. 8 selector hub C, selector No. 8 contacts R62–1 n/c (not shown), the plug wire connecting No. 8 selector hub N and No. 7 selector hub T, selector No. 7 contacts R61–1 n/o (not shown), plug wire connecting No. 7 selector hub C and No. 6 selector hub C, selector No. 6, contacts R60–1 n/c (not shown), the plug wire connecting No. 6 selector hub N and primary feed hub 161 (see also FIG. 6h), contacts R14–2, primary feed magnet 63, to the other side of the line. It may be seen that this circuit is also effective to energize magnet coil HS3 connected in parallel circuit to magnet 63.

*Eject magnet circuit.*—A parallel circuit to the afore-mentioned primary feed circuit is formed to energize the eject clutch magnet 65 (see also FIG. 2) through the plug wire connecting hubs 161 and 162 (see FIG. 8), relay contacts R12–3 (FIG. 6h), coil 65, to the other side of the line.

Due to the energization of the primary feed and eject clutch magnets 63 and 65 during the tail end of the third secondary feed cycle, a fourth primary feed cycle will occur, as stated previously, wherein the first primary card PC having a 9-hole punched therein (FIG. 9c) will be advanced into pocket SP1 (see also FIG. 9d); the second primary card having a 7-hole punched therein will feed past the primary reading station, and the third primary card having a 2-hole punched therein will feed past the primary sequence reading station. A new card, i.e., the fourth primary card having a 1-hole punched therein, will be advanced from the primary hopper so as to take up the place of the removed third primary card. It will become clear as the description advances that as a result of the fourth primary feed cycle, there will exist an equal cross-feed condition, and low primary sequence and low secondary sequence conditions.

During the said fourth primary feed cycle, the following circuit operations will also take place:

(1) *Cycle delay selector transfer circuit.*—Inasmuch as a low primary sequence condition was detected during the third secondary feed cycle (see FIG. 9c), a low primary sequence impulse during the said third cycle was transmitted to cycle delay pick-up hub 139 (see FIGS. 6k and 8) so as to energize relay coil R44P. And, as brought out previously, since the card feed cycle immediately following the one in which relay R44 is picked is a primary cycle, relay coil R46P is caused to energize during the said following primary feed cycle, i.e., the fourth one, in the manner described previously through cam contacts P7 and relay contacts R44–2. This, of course, causes the cycle delay relay contacts R46–3 to transfer so as to connect hubs 140 and 141.

(2) *Selector Nos. 4, 8, 10, and 13 pick circuits.*—In view of the cycle delay selector operating, these selectors will pick via a circuit from the +40 volt line 217 (FIG. 6k) through cam contacts CR26 at 169° (see also FIG. 7), the plug wire connecting hubs 165 (see also FIG. 8) and 140, cycle delay selector contacts R46–3 n/o (FIG. 6k), and the plug wire connecting hubs 141 and 181 (FIG. 8).

(3) *Pocket shift setup circuit.*—At approximately 236° of the fourth primary feed cycle, a circuit is completed from the +40 volt line 217 (FIG. 6h) through contacts CR3, R17–3, CR4, the plug wire connecting one of the hubs 152 (see also FIG. 8) and selector No. 9 hub C, selector No. 9 contacts R63–1 n/o (not shown), the plug wire connecting selector No. 9 hub T and selector No. 10 hub C, selector No. 10 contacts R64–1 n/o (not shown), the plug wire connecting selector No. 10 hub T and pocket shift hub 186 (see FIG. 6j), relay contacts R477–3, R478–3, and R488–1 n/c, diode rectifier 187, relay coil R487LP, to the other side of the line. As may be seen quite clearly in FIG. 6j, a parallel circuit is also effective to energize relay coil R490P, the purpose of which will be brought out hereinafter. As the description advances, it will be shown that the completion of the just described pocket shift setup circuit during one cycle will cause a pocket shift to take place during the next following card feed cycle.

In view of the fact that the primary and the primary sequence data read-in circuits have been traced previously, it is believed unnecessary to do so again at this time. Hence, it may be stated that as a result of the fourth primary feed cycle, a 7-value will be stored in primary unit 120 (see FIG. 9d), and a 2-value will be stored in primary sequence unit 122. The record card data values already stored in secondary unit 121, first secondary sequence unit 123 and second secondary sequence unit 124 during previous secondary feed cycles, are not altered in any way whatsoever during the fourth primary feed cycle. In view of this fact, after the fourth primary feed cycle has been completed, there will exist a low secondary sequence condition, an equal primary-secondary cross-feed condition, and a low primary sequence condition. The equal primary-second cross-feed condition will cause relay R483 (FIG. 6g) to pick via the cross-feed compare circuits, whereupon the resulting engagement of contacts R483-2 (FIG. 6h) will cause a voltage to be applied to equal hubs 180 (see also FIG. 8), whereby selectors Nos. 1 and 2 are operated. This causes circuits to form via the No. 1 and No. 2 selector contacts connecting their respective C and T hubs to the secondary feed, primary eject and primary feed hubs 153, 162, and 161, respectively. As a result, a fourth secondary feed cycle will occur simultaneously with a fifth primary feed cycle in accordance with primary feed rule No. 3 and secondary feed rule No. 3; i.e., primary and secondary feed cycles will occur in response to an equal cross-feed condition.

*Simultaneous fourth secondary and fifth primary feed cycles*

The fourth secondary feed cycle will be effected through the following circuit which is completed during the tail end of the fourth primary feed cycle.

*Secondary feed circuit No. 3.*—From the +40 volt line 217 (FIG. 6h) through contacts CR3, R17-3, CR4, the plug wire connecting one of the hubs 152 (see also FIG. 8) and selector No. 1 hub C, No. 1 selector contacts R55-1 n/o, the plug wire connecting selector No. 1 hub T and secondary feed hub 153 (FIG. 6h), relay contacts R9-2 n/o, secondary feed magnet 62, to line 218. A parallel circuit to secondary feed magnet 62 is effective to energize relay coil R486P through relay contacts R485-1 which are still closed as a result of relay R485 being picked during the third secondary feed cycle.

The primary feed magnet is energized to effect the fifth primary feed cycle via the following circuit:

*Primary feed circuit No. 3.*—From the +40 volt line 217 (FIG. 6h) through cam contacts CR3, relay contacts R17-3, cam contacts CR4, the plug wire connecting one of the hubs 152 (see also FIG. 8) and selector No. 2 hub C, selector No. 2 contacts R56-1 n/o, the plug wire connecting selector No. 2 hub T and primary eject hub 162 (see also FIG. 6h), the plug wire connecting hubs 162 and 161, relay contacts R14-2, primary feed magnet 63, to the other side of the line. As brought out previously, a parallel circuit is effective to energize magnet HS3. A circuit is also effective to energize eject magnet 65 via hub 162 and relay contacts R12-3.

Figure 9B:
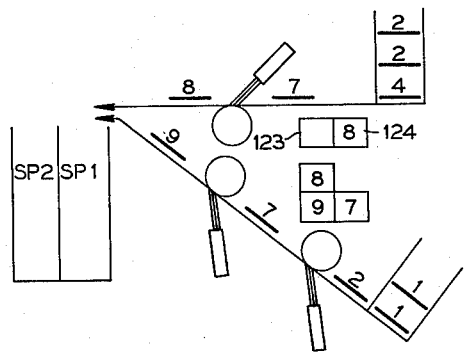
Figure 9C:
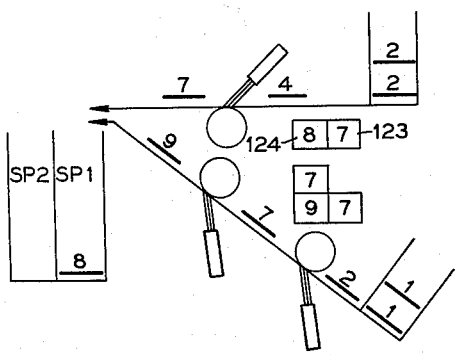
Figure 9D:
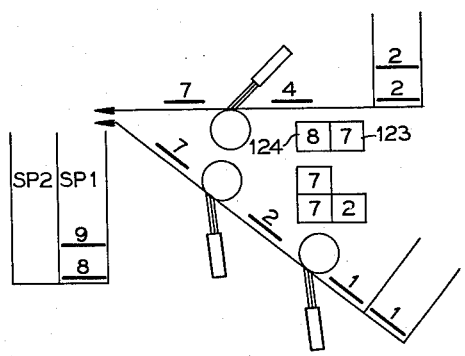
Figure 9E:
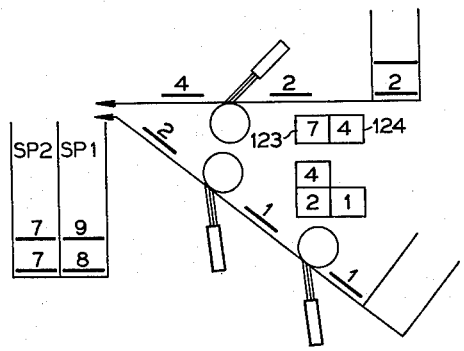

*Pocket shift circuit.*—In view of the fact that the latch pick relay coil R487LP (FIG. 6j) was energized during the fourth primary feed cycle as was brought out hereinbefore, pocket select magnet 67 (see FIGS. 3 and 6h) was also energized at approximately 238° during the said feed cycle through cam contacts CR28 (see also FIG. 7) and now closed relay contacts R487-2. The energization of pocket select magnet 67 (FIG. 3) unhooks lever 53 as described hereinbefore, whereby the rear end of chute blade 56 is moved below the card line of the primary card feed unit so that cards being fed from either of the two feed units are directed to pass into pocket SP2 (see also FIG. 1). Lever 53 remains in a downward position until magnet 68 (see FIG. 6h) is energized at approximatetly 214° of the next card feed cycle. Hence, the second secondary card SC and the second primary card PC each having a 7-hole punched therein (see FIG. 9d), are fed simultaneously into pocket SP2 (FIG. 9e). Accordingly, at the completion of the said simultaneous primary and secondary feed cycles, the first primary and first secondary cards are stacked in pocket SP1 and the second primary and second secondary cards are stacked in pocket SP2.

It will be recalled that at approximately 230° of the fourth primary feed cycle, relay coil R490P (FIG. 6j) was energized along with relay coil R487LP. Relay R490 is maintained picked, once energized, by the energization of coil R490H (FIG. 6k) until approximately 355° of the next following card feed cycle. If the card feed cycle following the one in which relay R490 is picked, is a primary feed cycle, one of the secondary sequence code relay data clearing relays R42 (see also FIG. 6i) or R43 will be energized via contacts P5, R490-2 and R485-4. Which one of the aforementioned data clearing relays will be picked will depend, of course, upon the status of relay R485. Hence, inasmuch as the fourth primary feed cycle during which relay R490 was picked is followed by a fifth primary feed cycle, and since relay R485 is in an operated status due to the coil R485LP being energized during the third secondary feed cycle, code relay data clearing relay R43 will be energized during the said fifth primary feed cycle via the normally open contacts R485-4. Inasmuch as the fifth primary feed cycle is accompanied by the fourth secondary feed cycle, a parallel circuit to relay R43 is completed from line 217 through contacts S4 and 485-3 n/o. As brought out previously, the operation of relay R43 will cause the operation of restore interlock relay R41 (FIG. 6j) which, in turn, will condition unit 124 (FIGS. 6b and 9e) for operation.

As is apparent from FIG. 9e, during the said simultaneous card feed cycles, the third secondary card having a 4-hole punched therein is advanced through the secondary reading station, the third primary card having a 2-hole punched therein is fed past the primary reading station, and the fourth primary card having a 1-hole punched therein is advanced past the primary sequence reading station. Consequently, after these card feed cycles, a 7-value is stored in first secondary sequence unit 123 (FIG. 9e), a 4-value is stored in secondary unit 121, a 2-value is stored in primary unit 120, a 4-value is stored in second secondary sequence unit 124, and a 1-value is stored in the primary sequence unit 122. This is represented in the machine by the energization of code relays R107 (FIG. 6b), R110, R112, R118, R379, and R381. Due to the energization of these code relays, all of the correction relays shown in FIGS. 6e and 6f are energized through the labyrinth of code relay contacts also shown therein. The energization of all of the correction relays along with the energization of the aforementioned code relays, causes a low secondary sequence condition to exist with a low primary cross-feed condition and a low primary sequence condition. Since the low primary sequence condition detected during the fourth primary feed cycle has been followed by the fifth primary feed cycle, the detection of a low primary sequence condition during the fifth primary feed cycle is actually a primary step-down condition. This will be explained in detail shortly under the heading "Cycle delay selector hold." The low secondary sequence condition is of course, resolved to be a secondary step-down, so that a sixth primary feed cycle will occur in accordance with primary feed rule No. 2; i.e., a primary feed cycle will occur as a result of a low primary cross-feed condition which is accompanied by a sequence step-down condition in both the primary and secondary feeds.

*Cycle delay selector hold.*—The low primary sequence condition which is detected during the fourth and fifth primary card feed cycles will maintain the cycle delay selector represented by contacts R46-3 (FIG. 6k) operated, notwithstanding the fact that a drop-out impulse was directed to hub 143 (see FIGS. 6k and 8) each cycle during the formation of the aforedescribed pocket shift setup circuit. To review this point briefly, an examination of FIGS. 6h and 8 will show that a cycle delay selector drop-out pulse to hub 143 via the pocket shift hub 186 occurs at substantially the same time that a low primary sequence impulse is directed to the cycle delay selector pick-up hub 139. The drop-out pulse causes the energization of relay coil R45P which, as has already been explained, causes a drop-out of the cycle delay selector relay R46 by opening the circuit to coil R46H2. The circuit to coil R46H1 will remain closed, however. The voltage impulse to the pick-up hub 139 causes the energization of relay coil R44P, so that the simultaneous energization of coils R44P and R45P, once the cycle delay selector relay R46 is already picked, will result in the said cycle delay selector relay R46 remaining picked for at least another machine cycle.

Since the last primary card having a 1-hole punched therein is moved out of the primary feed hopper PH (see FIG. 9e) during the fifth primary feed cycle, the machine will stop feeding cards at the end of the simultaneous fourth secondary and fifth primary feed cycles. This is for the reason that when the last primary card is fed out of the primary hopper, primary hopper contacts 69 (FIG. 6c) close to pick up primary hopper relays R1 and R2. The resulting transfer of their contacts such as R1-2, will open the test circuit to relay R17 when cam contacts CR1 open. This, in turn, will prevent the completion of the feed clutch circuits when cam contacts CR3 (FIG. 6h) and CR4 close due to the now separated relay contacts R17-3. Thus, in order to re-start the machine it is necessary to depress the runout key (FIG. 6c) so as to energize start relay coil R17H. Furthermore, it will be necessary to maintain the runout key depressed until all of the primary cards have been moved out of the primary feed, at which time relay coil R17H will remain energized through cam contacts CR1, stop key contacts 220, relay contacts R35-1, R13-2 n/o, R15-2, R1-3 n/c, R9-1 n/o, and R3-2 n/c, safety contacts 226, and relay contacts R17-2.

At the end of the said simultaneous feed cycles, selectors Nos. 5, 6, 3, 7, 9, 12, 4, 8, 10, and 13, and the cycle delay selector will be operated.

*Sixth primary feed cycle*

In view of the low primary cross-feed condition (FIG. 9e) and the sequence step-down conditions in both feeds after the preceding simultaneous card feed cycles, the primary feed clutch magnet is energized during said cycles via the following circuit so as to effect the sixth primary feed cycle:

*Primary feed circuit No. 4.*—From the +40 volt line 217 (FIG. 6h) through contacts CR3, R17-3, CR4, the plug wire (see also FIG. 8) connecting one of the hubs 152 and selector No. 2 hub C, the plug wire connecting selector No. 2 hub N and selector No. 3 hub C, selector No. 3 contacts R57-1 n/o (not shown) the plug wire connecting selector No. 3 hub T and selector No. 4 hub T, selector No. 4 contacts R58-1 n/o, the plug wire connecting selector No. 4 hub C and selector No. 5 hub C, selector No. 5 contacts R59-1 n/o, the plug wire connecting the No. 5 selector hub T and primary feed hub 161 (see also FIG. 6h), relay contacts R14-2, primary feed magnet 63, to the other side of the line. As mentioned previously, this circuit is also effective to energize magnet HS3. In addition thereto, the afore-described parallel circuit via relay contacts R12-3 is effective to energize eject magnet 65.

During the preceding fifth primary feed cycle, an impulse was directed to the drop-out hub 143 (FIG. 8) of the cycle delay selector via a circuit from line 217 (FIG. 6h) through contacts CR3, R17-3, CR4, the plug wire connecting one of the hubs 152 and selector No. 9 hub C, No. 9 selector contacts R63-1 n/o, the plug wire connecting selector No. 9 hub T and selector No. 10 hub C, No. 10 selector contacts R64-1 n/o, the plug wires connecting selector No. 10 hub T and cycle delay selector drop-out hub 143 via the connected pocket shift hubs 186. The cycle delay selector will remain in an operated condition, however, due to the application of an impulse during the fifth primary feed cycle to the pick-up hub 139 (see FIGS. 6k and 8).

A parallel circuit to the preceding one was completed from hub 186 (see FIGS. 6j and 8) through contacts R477-3, R478-3, and R388-1 n/o, the diode rectifier to relay coil R487LT and line 218. Furthermore, a parallel circuit was completed to energize relay coil R490P. As stated previously, relay R490 will remain energized until approximately 355° of the next following machine cycle due to the energization of coil R490H (see also FIG. 6k). Since relay R487 (FIG. 6j) was picked during the fourth primary feed cycle, it may be seen quite readily that latch type relay R488 will have been picked during the fifth primary feed cycle at approximately 185° via a circuit from line 217 through contacts CR31 and 487-1 n/o. Relay 485 (FIG. 6i) was dropped out during the fourth secondary feed cycle via contacts R486-2 at approximately 348° of said cycle when cam contacts S3 close. Hence, inasmuch as relay coil R490P (FIG. 6j) was energized during the fifth primary feed cycle, prior to data reading time of the sixth primary feed cycle the first secondary sequence clearing relay R42 is energized via a circuit from the +40 volt line 217 (FIG. 6i) through contacts P5, R490-2, and R485-4 n/c, coil R42, to the other side of the line. Hence, due to the energization of said relay coil R42, contacts R42-1 (FIG. 6d) separate during a sixth primary feed cycle so that the circuit to the first secondary sequence code relay hold coils R372H—R387H (see also FIG. 6d) are opened at 300° when cam contacts CR14 open. In view of the foregoing, after the data reading portion of the sixth primary feed cycle, a blank value will be stored in the first secondary sequence unit 123 (see FIG. 9f). Furthermore, after said reading portion, a 4-value will be stored in second secondary sequence unit 124, a 4-value will be stored in secondary unit 121, a 1-value will be stored in primary unit 120, and a 1-value will be stored in primary sequence unit 122.

*Secondary sequence unit data reset with pocket shift.*—An examination of FIGS. 6j and 8 will show that each pocket shift impulse to hub 186 whereby either coil R487LT or coil R487LP is energized, is accompanied by the energization of relay coil R490P. The operation of this latter relay during one cycle which is immediately followed by a primary feed cycle, will effect the energization of one of the clearing relays R42 (FIG. 6i) or R43 via cam contacts P5 and relay contacts R490-2. It will be recalled that relay R390 was energized at the tail end of the fourth primary feed cycle (FIG. 9d) and the tail end of the simultaneous fourth secondary and fifth primary feed cycles (FIG. 9e). Due to the fact that the operation of relay R490 during the fourth primary feed cycle was immediately followed by a secondary feed cycle, the operation of clearing relay R43 resulted whereby the data in unit 124 was cleared out immediately prior to the entry of new data therein as produced by the feeding of a secondary card past the secondary brush station.

The operation of relay R490 during the aforementioned simultaneous feed cycles is not, however, immediately followed by a secondary feed cycle but instead by the sixth primary feed cycle. Thus, during the sixth primary feed cycle an impulse is directed via contacts P5, R490-2, and R485-4 n/c to relay R42. The operation of this relay causes the operation of restore interlock relay R40 (FIGS. 6j) whose contacts, in turn, open the code relay hold circuits associated with first secondary sequence unit 123 (see FIGS. 6b and 9f). In view of the fact that there is no secondary feed cycle at this time, but instead only the sixth primary feed cycle, at the end of the reading portion of said primary cycle a blank value will appear in first secondary sequence 123.

The foregoing operation whereby the inferior secondary sequence position is cleared out during a primary feed operation, is necessary to, in effect, start the sorting-by-collation operation anew. That is, record cards from either feed are fed to one stacker pocket until a second sequence step-down condition is detected. Consequent upon the detection of a second sequence step-down condition, a pocket shift is either effected as has been described previously, so that the record cards will then be fed to the second stacker pocket. This will continue until two sequence step-down conditions are detected once again, whereupon the card distributing mechanism will be altered to feed record cards into the first stacker pocket once again. In order to decrease the number of sequence step-downs, it is necessary that the machine operate as described hereinabove. However, in order to effect such a machine operation, it is necessary that the secondary sequence unit wherein the inferior secondary data are stored be cleared out consequent upon a primary feed cycle immediately following the detecting of a second sequence step-down condition. It may be observed by comparing FIGS. 9b and 9f, that the arrangement of the secondary sequence data is substantially similar. FIG. 9b, it will be recalled, represents the machine, after the third primary run-in feed cycle. Hence, FIG. 9f shows the machine in somewhat a similar "third primary run-in feed cycle."

Figure 9F:
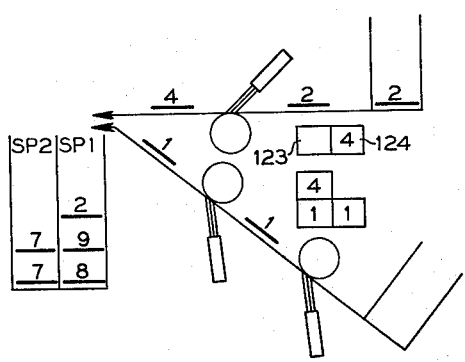

It is believed to be sufficient by this time to state without further explanation that the high secondary sequence condition (secondary sequence step-up) shown in FIG. 9f, low primary cross-feed condition, equal primary sequence condition (primary sequence step-down inasmuch as the cycle delay selector has not been dropped out), as is caused by the energization of code relays R107 (FIG. 6b), R110, R112, R116, R118, and R379, effects a fifth secondary feed cycle in accordance with the previously stated fourth secondary feed rule; i.e., a secondary feed cycle will occur as a result of a low primary cross-feed condition which is accompanied by a primary sequence step-up and a secondary sequence step-down.

Fifth secondary feed cycle

The secondary feed clutch magnet is energized during the sixth primary feed cycle due to the operation of cycle delay selector and selectors Nos. 4, 5, 6, 8, 10, and 13, via the following circuit so as to effect said fifth secondary feed cycle:

*Secondary feed circuit No. 4.*—From the +40 volt line 217 (FIG. 6h), contacts CR3, R17–3, CR4, the plug wire connecting one of said hubs 152 (see also FIG. 8) and selector No. 1 hub C, No. 1 selector contacts R55–1 n/c, the plug wire connecting selector No. 1 hub N and selector No. 8 hub C, No. 8 selector contacts R62–1 n/c, the plug wire connecting selector No. 8 hub N and selector No. 7 hub T, No. 7 selector contacts R61–1 n/o, the plug wire connecting selector No. 7 hub C and selector No. 6 hub C, No. 6 selector contacts R60–1 n/o, the plug wire connecting selector No. 6 hub T and secondary feed hub 153 (see FIG. 6h), relay contacts R9–2 n/o, secondary feed clutch magnet 62, to the other side of the line.

In view of the fact that relay R485 is not picked at this time, relay coil R486P is not energized along with secondary feed clutch magnet 62. Relay coil R485LP (FIG. 6i), however, is energized during this fifth secondary feed cycle at 348° via contacts S3 and R486–2 n/c. The secondary and first secondary sequence clearing relays R38 and R42, respectively, are energized at approximately 280° via contacts S4 (see also FIG. 7) and R485–3 n/c, prior to the data reading portion of said fifth secondary feed cycle while the fourth secondary card SC having a 2-hole punched therein is advanced past the secondary reading station.

Figure 9G:
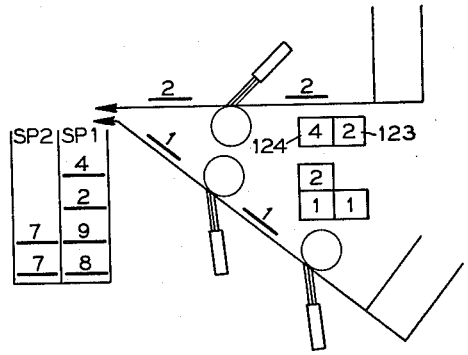
Figure 9H:
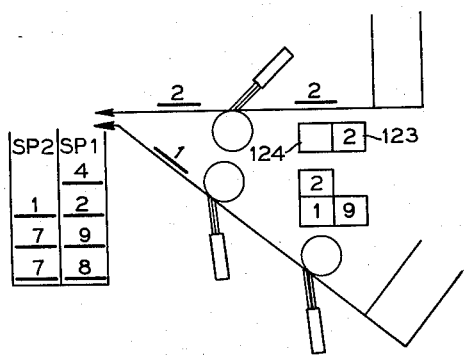
Figure 9I:
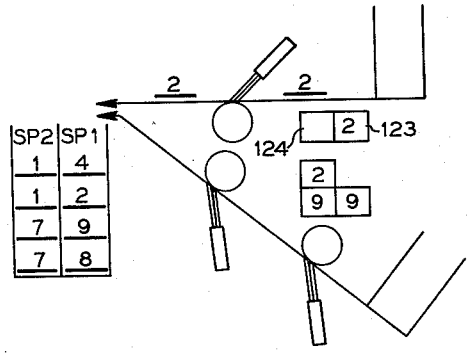

As is shown in FIG. 9g, after the data reading portion of the fifth secondary feed cycle, a 4-value will be stored in second secondary sequence unit 124, a 2-value will be stored in first secondary sequence unit 123, a 2-value will be stored in secondary unit 121, a 1-value will be stored in primary unit 120, and a 1-value will be stored in primary sequence unit 122. These stored data values are represented by the energization of code relays R107 (see also FIG. 6b), R111, R116, R118, R378, R379, and R381.

Inasmuch as the inferior secondary sequence position 124 (FIG. 9g) has a 4-value stored therein whereas the dominant secondary sequence position 123 has a 2-value stored therein, after the data reading portion of the fifth secondary feed cycle, a secondary sequence step-down condition is detected. On the other hand, notwithstanding an equal primary sequence condition as represented by the 1-value stored in primary unit 120 and the 1-value stored in primary sequence unit 122, a primary sequence step-down condition is still evident at the tail end of the fifth secondary feed cycle due to the fact that the cycle delay selector as represented by relay R46 (see FIG. 6k) is still in an operated status. Hence, in accordance with the second primary feed rule which states that a low primary feed cycle will occur as a result of a low primary cross-feed condition which is accompanied by a sequence step-down condition in both feeds, the primary feed clutch magnet 63 (FIG. 6h) will be energized at the tail end of the fifth secondary feed cycle. Furthermore, due to the operation of the cycle delay selector as well as selectors Nos. 3, 7, 9, 12, 13, 10, 8, 4, 5, and 6, pocket shift relay R487 will be energized via a circuit from line 217 (FIG. 6k) through contacts CR26, the plug wires connecting hubs 165 and 186 (FIGS. 6j and 8) via hubs 140 and 143, contacts R477–3, R478–3, R488–1 n/c, diode rectifier 187, coil R487LP, to line 218. As a result, shift magnet 67 (see FIGS. 3 and 6h) will be energized so as to cause the card distributing mechanism of the present machine to direct the cards into stacker pocket SP2.

As may be seen in FIG. 8, the impulse to pocket shift hub 186 is also directed to cycle delay selector drop-out hub 143 (see also FIG. 6k), whereby drop-out relay R45 is picked. Inasmuch as at this time there is no low primary sequence condition, the cycle delay selector R46 will be caused to drop out at approximately 261° in the manner described previously.

The energization of coil R487LP (FIG. 6j) during the fifth secondary feed cycle is accompanied by the energization of coil R490P as also described previously. Hence, inasmuch as the next following feed cycle will be the seventh primary feed cycle, and since relay R485 has been picked during the fifth secondary feed cycle, data clearing relay R43 will be operated during the seventh primary feed cycle via a circuit from line 217 (FIG. 6i) through contacts P5, R490–2, and R484 n/o.

Seventh primary feed cycle

The seventh primary feed cycle is effected via a circuit including hub 152 (FIG. 8), the C and N hubs of selector No. 2, the C and T hubs of selector No. 3, the T and C hubs of selector No. 4, the C and T hubs of selector No. 5, primary feed hub 161 (see also Fig. 6h). Hence, the fourth primary card having a 1-hole punched therein (FIG. 9h) is advanced into stacker pocket SP2, the fifth primary card having a 1-hole punched therein is moved through the primary reading station, and the data stored in the inferior secondary sequence unit 124 is cleared out. As a result of the foregoing, after the reading portion of the seventh primary feed cycle, there is a blank value stored in secondary unit 124, a 2-value stored in first secondary sequence unit 123, a 2-value stored in secondary unit 121, a 1-value stored in primary unit 120, and a 9-value stored in primary sequence unit 122.

Referring to FIG. 6a, it may be seen that during the runout of cards in either feed, a 9-value is automatically read in at the reading station having no card. For example, during the primary feed runout, contacts R2–3 will be closed as a result of the closure of primary hopper contact 69 (see also FIG. 6c). In addition, the separation of primary card lever contacts 223 during the seventh primary feed cycle will cause the de-energization of relay R7 so that contacts R7–3 (FIG. 6a) are in normal status. Consequently, when primary cam contacts P1 close at 9-time, a correspondingly timed impulse will be transmitted to contacts P1, R2–3, and R7–3 n/c, to sequence station brush hub 130. Similarly, when a primary card is absent at the primary reading station during card runout, the separation of primary card lever contacts 225 (FIG. 6c) will cause contacts R6-3 to return to a normal status so that a 9-value may be automatically read at the primary reading station. The absence of a secondary card in the secondary hopper will cause relay R4 (FIG. 6c) to become energized, whereupon at 9-time an impulse will be transmitted through secondary cam contacts S1 (FIG. 6a) and relay contacts R4-2, to secondary station brush hub 100.

After the data reading portion of the seventh primary feed cycle, a secondary sequence step-down condition, a low primary condition, and a primary sequence step-up condition will be detected. As a result, the operated selectors will include selectors Nos. 5 and 6. Hence, an eighth primary feed cycle will occur.

Eighth primary feed cycle

In view of the high secondary sequence, a low primary, high primary sequence condition is detected at the completion of the seventh primary feed cycle, as evidenced by the energization of code relays R107 (FIG. 6b), R108, R110, R111, R116, R118, R379, and R382, the eighth primary feed cycle will occur in accordance with the first primary feed rule which states that a primary feed cycle will occur as a result of a low primary cross-feed condition which is accompanied by a sequence step-up condition in each of the two feed units.

*Primary feed circuit No. 5.*—From the +40 volt line 27 (FIG. 6h) through contacts CR3, R17-3, CR4, the plug wire connecting one of the hubs 152 and selector No. 3 hub C (see also FIG. 8), No. 3 selector contacts R57 n/c, the plug wire connecting selector No. 3 hub N and selector No. 4 hub N, number 4 selector contacts R58 n/c, the plug wire connecting selector No. 4 hub C, and selector No. 5 hub C, No. 5 selector contacts R59 n/o, the plug wire connecting selector No. 5 hub T and primary feed hub 161, relay contacts R12-2 n/o (see also FIG. 6h), primary feed clutch magnet 63, to the other side of the line. The simultaneous energization of eject magnet 65 causes the fifth primary card having a 1-hole punched therein to be fed into pocket SP2 during the eighth primary feed cycle (see FIG. 9i).

Sixth secondary feed cycle

As a result of the automatic 9-value being read into the primary and primary sequence units 120 and 122, respectively, a high secondary sequence (sequence step-up), low secondary cross-feed condition, equal primary sequence (sequence step-up) condition exists. In view of this, none of the selectors will be operated and a sixth secondary feed cycle will occur when secondary feed circuit No. 2, previously described, is formed in accordance with the first secondary feed rule which states that a secondary feed cycle will occur as a result of a low secondary cross-feed condition which is accompanied by a sequence step-up condition in both the feeds. Thus, during the said feed cycle, the fourth secondary card having a 2-hole punched therein (FIG. 9i) is fed into stacker pocket SP2, whereas the fifth and last secondary card having a 2-hole punched therein is moved through the secondary reading station.

Seventh secondary feed cycle

After the data reading portion of the sixth secondary feed cycle, an equal secondary sequence (sequence step-up) condition, low secondary cross-feed condition, equal primary sequence (sequence step-up) condition exists as is evidenced by the energization of code relays R108 (FIG. 6b), R111, R116, R118, R378, R379, R381, and R382. In accordance with the first secondary feed rule which governs the preceding sixth secondary feed cycle, a seventh secondary feed cycle will take place as a result of the formation of secondary feed circuit No. 2 previously described. Accordingly, the last secondary card having a 2-hole punched therein will be fed into stacker pocket SP2 (FIG. 9j).

Second machine run

Figure 9J:
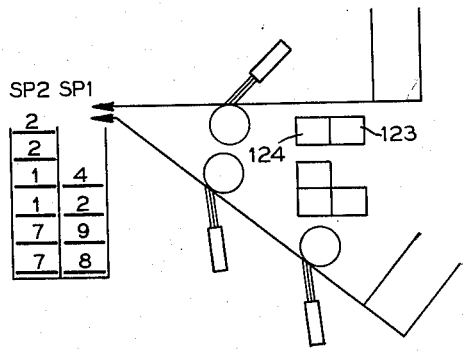

As shown in FIG. 9j, after the first machine run of cards has been completed, the first and third primary and secondary cards are arranged in stacker pocket SP1, whereas the second, fourth and fifth primary and secondary cards are arranged in stacker pocket SP2. For the second machine run, the cards now in stacker pocket SP1, i.e., those perforated with 8, 9, 2, and 4 index position holes, are placed in the primary hopper PH (see also FIG. 1), and the cards in stacker pocket SP2, i.e., those perforated with 7, 7, 1, 1, 2, and 2 holes, are placed in secondary hopper SH. It is to be observed that prior to the first machine run there were three record card sequence step-downs in each of the feed units as indicated by the primary 9-value and 7-value cards, the primary 7-value and 2-value cards, and the primary 2-value and 1-value cards, prior to the second machine run there is only one sequence step-down in each of the respective feeds. The latter two sequence step-down conditions appear between the primary 9-value and 2-value cards (FIG. 9j) and the secondary 7-value and 1-value cards. Hence, during the first machine operation, the number of record card sequence step-downs has been decreased from 6 to 2.

After the cards in stacker pockets SP1 and SP2 in FIG. 9j are placed in hoppers PH and SH, respectively, as stated previously, the said cards are run into the machine in the manner described hereinbefore, whereupon comparing and feed circuits similar to those described previously cause the cards perforated with 7, 7, 8, and 9 holes to feed into pocket SP1, and the cards perforated with 1, 1, 2, 2, 2, and 4 holes, to feed into stacker pocket SP2. It may be seen then, that after the second machine run there are no sequence step-downs in either set of cards. Hence, after two machine operations, the number of sequence step-downs has been completely eliminated. Thus, that which remains is simply a somewhat standard collator merging operation whereby two sets of record cards each set of which is arranged in an ascending sequential order, will be merged into one assorted set.

Third machine run

Those cards in stacker pocket SP1 after the second machine run, i.e., the cards perforated with 7, 7, 8, and 9 holes, are placed in primary hopper PH (see also FIG. 1), and those cards in pocket SP2 after the second machine run, i.e., those perforated with 1, 1, 2, 2, 2, and 4 holes, are placed into secondary hopper SH. These cards are then run into the machine once again in the manner described previously so that the cards are finally caused to merge in pocket SP1 in an ascending order without any record card sequence step-downs. Thus, two sets of record cards each having three record card sequence step-down conditions have been sorted into one associated set having no record card sequence step-down condition, in three machine runs.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a machine of the class described having secondary record card data reading means; primary record card data reading means; primary feeding means for advancing primary record cards, one-by-one, past said primary reading means; secondary feeding means for advancing secondary record cards, one-by-one, past said secondary reading means; data storage means controlled by said primary and said secondary reading means respectively; means controlled by said data storage means for cross-feed comparing primary and secondary record card data; means controlled by said primary storage means for sequence comparing primary record card data; means controlled by said secondary storage means for sequence comparing secondary record card data; and means selectively governed by said cross-feed and said sequence comparing means for rendering said primary feeding means operated to advance primary record cards consequent upon a low primary cross-feed condition accompanied by similar primary and secondary sequence conditions, and a low secondary cross-feed condition accompanied by dissimilar primary and secondary sequence conditions, and for rendering said secondary feeding means operated to advance secondary record cards consequent upon a low secondary cross-feed condition accompanied by similar primary and secondary sequence conditions, and a low primary cross-feed condition accompanied by dissimilar primary and secondary sequence conditions.

2. A machine according to claim 1 additionally comprising feed control means selectively governed by said cross-feed comparing means for rendering said primary and said secondary feeding means operated concurrently and simultaneously in response to an equal primary and secondary cross-feed condition.

3. A machine according to claim 2 additionally comprising a pair of record card receiving stations; means common to said primary and said secondary record card feeding means and to said stations for distributing primary and secondary record cards advanced past said respective reading means to said stations one station at a time; and other means selectively governed by said cross-feed and said sequence comparing means for controlling said distributing means in accordance with the plural comparison effected thereby so as to selectively feed primary and secondary record cards separately and simultaneously into a select one of said record card receiving stations.

4. In a machine of the class described having a single secondary record card data reading means and a pair of primary record card data reading means, the combination of primary feeding means for advancing primary record cards, one-by-one, past said pair of primary reading means; secondary feeding means for advancing secondary record cards, one-by-one, past said secondary reading means; primary and secondary data storage means controlled by one of said primary and said secondary reading means; means controlled by said storage means for cross-feed comparing data on primary and secondary record cards; primary sequence data storage means controlled by the other of said primary reading means; means controlled by the primary and primary sequence storage means for detecting primary sequence step-down conditions; secondary sequence data storage means controlled by said secondary reading means; means controlled by the secondary and secondary sequence storage means for detecting secondary sequence step-down conditions; a pair of record card stacker pockets; means including an electromagnetically governed chute blade assembly common to said primary and said secondary feeding means and to said stacker pockets for normally distributing primary and secondary record cards advanced past said respective reading means to the first one of said pair of stacker pockets; means governed by said cross-feed and said sequence comparing means for selectively controlling said primary and said secondary feeding means in accordance with the plural comparison effected thereby so as to selectively feed primary and secondary record cards separately and simultaneously past said common chute blade assembly into a select one of said pair of stacker pockets; and other means governed by said cross-feed and said sequence comparing means for controlling said common chute blade assembly so as to distribute primary and secondary record cards to the second one of said pair of stacker pockets in response to a primary sequence step-down condition and a secondary sequence step-down condition.

5. A machine according to claim 4 wherein said means for controlling said primary and said secondary feeding means includes a primary and a secondary clutch, respectively, for selectively operating said respective feeding means so as to advance primary record cards consequent upon a low primary cross-feed condition accompanied by similar primary and secondary sequence conditions, and a low secondary cross-feed condition accompanied by dissimilar primary and secondary sequence conditions, and so as to advance secondary record cards consequent upon a low secondary cross-feed condition accompanied by similar primary and secondary sequence conditions, and a low primary cross-feed condition accompanied by dissimilar primary and secondary sequence conditions.

6. In a machine of the class described having secondary record card data reading means, and primary record card data reading means, the combination of primary feeding means for advancing primary record cards, one-by-one, past said primary reading means; secondary feeding means for advancing secondary record cards, one-by-one, past said secondary reading means; data storage means controlled by said primary and said secondary reading means; comparing means controlled by said storage means for cross-feed comparing data of primary and secondary record cards; other means controlled by said primary storage means for sequence comparing data of primary record cards; means controlled by said secondary storage means for sequence comparing data of secondary record cards; a stacker pocket; and means governed by said cross-feed and said sequence comparing means for rendering said primary feeding means operated to advance primary record cards into said stacker pocket consequent upon a low primary data cross-feed condition accompanied by similar primary and secondary data sequence conditions, and consequent upon a low secondary data cross-feed condition accompanied by dissimilar primary and secondary data sequence conditions.

7. In a cyclically operable machine of the class described having a single secondary record card data reading means, primary record card data reading means, and primary sequence record card data reading means, the combination of primary feeding means for advancing primary record cards, one-by-one, past said primary sequence reading means during one primary feed cycle and past said primary reading means during a next following primary feed cycle; secondary feeding means for advancing secondary record cards, one-by-one, past said secondary reading means during one secondary feed cycle; storage means controlled by said primary and said secondary reading means; means controlled said storage means cross-feed comparing data of corresponding primary and secondary record cards each machine cycle; storage means controlled by said primary sequence reading means; means controlled by said primary sequence reading means and said primary storage means for sequence comparing data of primary record cards each machine cycle; means including an additional data storage unit controlled by said secondary reading means and controlled by said secondary feeding means for sequence comparing data of secondary record cards advanced past said secondary reading means during two successive secondary feed cycles; first means controlled by said cross-feed and said sequence comparing means for operation in response to a low primary cross-feed condition and similar primary and secondary sequence conditions; second means controlled by said cross-feed and said sequence comparing means for operation in response to a low secondary condition and dissimilar primary and secondary sequence conditions; third means governed by said cross-feed and said sequence comparing means for operation in response to a low secondary cross-feed condition and similar primary and secondary sequence conditions; fourth means controlled by said cross-feed and said sequence comparing means for operation in response to a low primary cross-feed condition and dissimilar primary and secondary sequence conditions; primary clutch means controlled by said first and said second means for operating said primary feeding means in response to the operation of said first and said second means; and secondary clutch means controlled by said third and said fourth means for operating said secondary feeding means in response to the operation of said third and said fourth means.

8. In a cyclically operable machine of the class described having a single secondary record card data reading station, a hopper for holding a set of secondary record cards, and a stacker pocket, the combination of record card feeding means for advancing secondary record cards, one-by-one, from said hopper past said reading station to said stacker pocket so that a succeeding one of said set of secondary record cards is advanced past said reading station each secondary record card feed cycle; first data comparing means including two data storage units for sequence comparing data of two succeeding secondary record cards for a secondary sequence step-down condition each card feed cycle; data control means including an input data tumbling switch for rendering said data storage units operable alternately during alternate secondary record card feed cycles; and electrical means connecting said reading station and said input data tumbling switch so that record and data being read during a record card feed cycle may be stored for comparison during said cycle in the one of said data storage units rendered operated during the said cycle.

9. A cyclically operable machine for comparing dominant and inferior secondary record card data according to claim 8 additionally comprising an output data tumbling switch associated with said data comparing means and operated in synchronism with said input data tumbling switch so that record card data being entered for storage during a secondary record card feed cycle in one of said data storage units stands as dominant data during the said cycle and as inferior data during a next following secondary record card feed cycle.

10. A cyclically operable machine according to claim 9 additionally comprising a pair of primary record card data reading stations, and primary record card feeding means for advancing primary record cards, one-by-one, past said pair of primary reading stations, in combination with, means controlled by one of said pair of primary reading stations and said secondary reading station for cross-feed comparing corresponding primary and secondary record card data each card feed cycle; second data comparing means controlled by said pair of primary reading stations for sequence comparing data of two succeeding primary record cards for a primary sequence step-down condition each card feed cycle; means governed by said cross-feed and said sequence comparing means during one card feed cycle for rendering said primary feeding means operated to advance primary record cards consequent upon a low primary cross-feed condition accompanied by primary and secondary sequence step-down conditions during a next following card feed cycle; and means governed by said sequence comparing means for controlling said data control means so as to render operated during a primary record card feeding operation the one of said two data storage units wherein inferior data are stored.

11. In a cyclically operable machine for operating upon perforated record cards, each record card having a plurality of adjacent record columns of index positions, wherein single and combinational index position perforations in any one of the record card columns represent data designations, and wherein one machine cycle corresponds to the passage of one record card, the combination of secondary station reading means including a plurality of reading elements each one of which is associated with and is for analyzing one of the plurality of aligned record card columns during one machine cycle; primary station reading means including a plurality of reading elements each one of which is associated with and is for analyzing one of the plurality of aligned record card columns during one machine cycle; a pair of record card receiving stations; primary feeding means for advancing primary record cards, one-by-one, past said primary reading station means and into one of said receiving stations; secondary feeding means for feeding secondary record cards, one-by-one past said secondary station reading means and into one of said receiving stations; primary and secondary storage means respectively controlled by said primary and said secondary station reading means; a cross-feed comparator controlled by said storage means for comparing primary and secondary data recorded on corresponding record cards; secondary sequence data storage means controlled by said secondary station reading means; secondary sequence comparator means controlled by the secondary and secondary sequence storage means for sequence checking the data recorded on succeeding secondary record cards; primary sequence data storage means controlled by said primary station reading means; a primary sequence comparator controlled by the primary and primary sequence data storage means for sequence checking the data recorded on succeeding primary record cards; first means controlled by said comparators for operation in response to a low primary condition and similar primary and secondary sequence conditions; second means controlled by said comparators for operation in response to a low secondary cross-feed condition and dissimilar primary and secondary sequence conditions; third means controlled by said comparators for operation in response to a low secondary cross-feed condition and similar primary and secondary sequence conditions; fourth means controlled by said comparators for operation in response to the low primary cross-feed condition and dissimilar primary and secondary sequence conditions; fifth means controlled by said cross-feed data comparator for operation in response to an equal cross-feed condition; means controlled by said first and said second means for operating said primary feeding means separately so as to advance primary record cards into one of said receiving stations; means controlled by said third and said fourth means for operating said secondary feeding means separately so as to advance secondary record cards to one of said receiving stations; and means controlled by said fifth means for operating said primary and said secondary feeding means simultaneously so as to advance primary and secondary record cards into one of said receiving stations.

12. A machine according to claim 11 additionally comprising electromagnetically controlled means for effecting a distribution of primary and secondary record cards being advanced by their respective feeding means to the other one of said pair of record card receiving stations; sixth means controlled by said secondary sequence data comparator for operation in response to a secondary sequence step-down condition; seventh means controlled by said primary sequence data comparator for operation in response to a primary sequence step-down condition; and means controlled by said sixth and said seventh means for operating said electromagnetically controlled record card distribution means in response to a primary and a secondary sequence step-down condition so that primary and secondary record cards are directed to said other one of said pair of receiving stations.

References Cited in the file of this patent

UNITED STATES PATENTS

| | | |
|---|---|---|
| 2,434,512 | Page et al. | Jan. 13, 1948 |
| 2,597,647 | Knutsen | May 20, 1952 |
| 2,602,544 | Phelps et al. | July 8, 1952 |
| 2,610,736 | Knutsen | Sept. 16, 1952 |
| 2,661,841 | Wallace | Dec. 8, 1953 |
| 2,681,145 | Ferry et al. | June 15, 1954 |